US009923900B2

United States Patent
Goodwin et al.

(10) Patent No.: US 9,923,900 B2
(45) Date of Patent: *Mar. 20, 2018

(54) ONLINE PRIVACY MANAGEMENT SYSTEM WITH ENHANCED AUTOMATIC INFORMATION DETECTION

(71) Applicant: Ensighten, Inc., San Jose, CA (US)

(72) Inventors: Joshua C. Goodwin, Mountain View, CA (US); Joshua R. Manion, Los Altos, CA (US)

(73) Assignee: Ensighten, Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/218,157

(22) Filed: Jul. 25, 2016

(65) Prior Publication Data

US 2016/0337367 A1    Nov. 17, 2016

Related U.S. Application Data

(63) Continuation of application No. 14/679,492, filed on Apr. 6, 2015, now abandoned, which is a continuation
(Continued)

(51) Int. Cl.
*H04L 29/06*      (2006.01)
*H04L 29/08*      (2006.01)
(Continued)

(52) U.S. Cl.
CPC .......... *H04L 63/101* (2013.01); *G06F 21/62* (2013.01); *G06F 21/6245* (2013.01);
(Continued)

(58) Field of Classification Search
CPC ..... H04L 63/101; H04L 63/102; H04L 63/20; H04L 67/22; H04L 63/0428; H04L 63/168; G06F 21/62; G06F 21/6245; G06Q 30/02
(Continued)

(56) References Cited

U.S. PATENT DOCUMENTS 6,487,604 B1   11/2002   Rochford et al.
6,535,912 B1   3/2003   Anupam et al.
(Continued)

FOREIGN PATENT DOCUMENTS

EP    1094635 A2   4/2001
EP    1105790 A1   6/2001
(Continued)

OTHER PUBLICATIONS

Yuchen Zhou et al, Protecting Private Web Content from Embedded Scripts, pp. 60-79, Springer-Verlag, 2011.*
(Continued)

*Primary Examiner* — Shanto M Abedin
(74) *Attorney, Agent, or Firm* — Banner & Witcoff, Ltd.

(57) ABSTRACT

A privacy management system (PMS) is disclosed for a Chief Privacy Officer (CPO) or other user to use in monitoring and/or controlling in realtime the flow of data (e.g., outflow) about the user and his/her online experience. The PMS may employ pattern recognition software to evaluate analytics data and potentially block private information from being sent within the analytics data. The PMS may provide a dashboard displaying a whitelist and/or blacklist indicating what destinations/sources are blocked or allowed as well as private information settings indicating what types of private information should be blocked. The PMS includes browser-client scripting code and may also include a PMS-certified verification icon and/or lock and unlock icons for display on webpages being monitored/controlled in realtime by the PMS.

5 Claims, 13 Drawing Sheets

Related U.S. Application Data of application No. 13/833,051, filed on Mar. 15, 2013, now Pat. No. 9,003,552, which is a continuation-in-part of application No. 13/554,603, filed on Jul. 20, 2012, now Pat. No. 8,516,601, which is a continuation of application No. 13/340,582, filed on Dec. 29, 2011, now Pat. No. 8,261,362.

(60) Provisional application No. 61/428,560, filed on Dec. 30, 2010.

(51) Int. Cl.
    *G06F 21/62*      (2013.01)
    *G06Q 30/02*      (2012.01)

(52) U.S. Cl.
    CPC ......... *G06Q 30/02* (2013.01); *H04L 63/0428* (2013.01); *H04L 63/102* (2013.01); *H04L 63/20* (2013.01); *H04L 67/22* (2013.01); *H04L 63/168* (2013.01)

(58) Field of Classification Search
    USPC .............................................. 726/2–4, 26–30
    See application file for complete search history.

(56) References Cited

U.S. PATENT DOCUMENTS

| | | | |
|---|---|---|---|
| 6,633,312 B1 | 10/2003 | Rochford et al. | |
| 6,654,803 B1 | 11/2003 | Rochford et al. | |
| 6,691,282 B1 | 2/2004 | Rochford et al. | |
| 6,959,420 B1 | 10/2005 | Mitchell et al. | |
| 7,331,049 B1* | 2/2008 | Jin | G06Q 10/107 709/201 |
| 7,389,343 B2 | 6/2008 | Busch et al. | |
| 7,584,435 B2 | 9/2009 | Bailey et al. | |
| 7,614,002 B2 | 11/2009 | Goldfeder et al. | |
| 7,689,665 B2 | 3/2010 | Lipton et al. | |
| 7,885,942 B2 | 2/2011 | Chand et al. | |
| 7,890,451 B2 | 2/2011 | Cancel et al. | |
| 7,941,394 B2 | 5/2011 | Error | |
| 8,166,406 B1 | 4/2012 | Goldfeder et al. | |
| 8,261,362 B2 | 9/2012 | Goodwin et al. | |
| 8,335,982 B1 | 12/2012 | Colton et al. | |
| 8,434,149 B1 | 4/2013 | Satish et al. | |
| 8,516,601 B2 | 8/2013 | Goodwin et al. | |
| 2001/0029552 A1 | 10/2001 | Foote et al. | |
| 2002/0143770 A1 | 10/2002 | Schran et al. | |
| 2003/0097421 A1 | 5/2003 | Wille et al. | |
| 2003/0101115 A1 | 5/2003 | Reddy | |
| 2003/0154442 A1 | 8/2003 | Papiemiak | |
| 2004/0093518 A1 | 5/2004 | Feng et al. | |
| 2004/0230820 A1* | 11/2004 | Hui Hsu | H04L 63/0281 726/26 |
| 2005/0039190 A1 | 2/2005 | Rees et al. | |
| 2005/0132070 A1 | 6/2005 | Redlich et al. | |
| 2005/0278333 A1* | 12/2005 | Daniels | G06F 21/6245 |
| 2006/0129507 A1 | 6/2006 | Pontoppidan | |
| 2006/0253583 A1 | 11/2006 | Dixon et al. | |
| 2007/0011304 A1 | 1/2007 | Error | |
| 2007/0016949 A1* | 1/2007 | Dunagan | G06F 21/51 726/22 |
| 2007/0112856 A1 | 5/2007 | Schram et al. | |
| 2007/0288247 A1 | 12/2007 | Mackay | |
| 2007/0299743 A1 | 12/2007 | Staib et al. | |
| 2007/0299964 A1 | 12/2007 | Wong et al. | |
| 2008/0040473 A1 | 2/2008 | Larsson et al. | |
| 2008/0052278 A1 | 2/2008 | Zlotin et al. | |
| 2008/0086454 A1 | 4/2008 | Bahadori et al. | |
| 2008/0183858 A1 | 7/2008 | Error | |
| 2008/0184116 A1 | 7/2008 | Error | |
| 2008/0189281 A1 | 8/2008 | Cancel et al. | |
| 2008/0201242 A1 | 8/2008 | Minnis et al. | |
| 2008/0201643 A1 | 8/2008 | Nagaitis et al. | |
| 2008/0228819 A1 | 9/2008 | Minnis et al. | |
| 2008/0256622 A1 | 10/2008 | Neystadt et al. | |
| 2008/0270471 A1 | 10/2008 | Schon | |
| 2009/0013413 A1 | 1/2009 | Vera et al. | |
| 2009/0024748 A1 | 1/2009 | Goldspink et al. | |
| 2009/0049120 A1 | 2/2009 | Sakairi et al. | |
| 2009/0100139 A1 | 4/2009 | Purdy et al. | |
| 2009/0100154 A1 | 4/2009 | Stevenson et al. | |
| 2009/0112918 A1 | 4/2009 | Terrell | |
| 2009/0132285 A1* | 5/2009 | Jakobovits | G06F 3/0482 705/3 |
| 2009/0150539 A1 | 6/2009 | Epling | |
| 2009/0182718 A1 | 7/2009 | Waclawik et al. | |
| 2009/0193497 A1 | 7/2009 | Kikuchi et al. | |
| 2009/0204478 A1 | 8/2009 | Kaib et al. | |
| 2009/0248484 A1 | 10/2009 | Surendran et al. | |
| 2009/0254511 A1 | 10/2009 | Yeap et al. | |
| 2009/0287713 A1 | 11/2009 | Anderson et al. | |
| 2009/0292677 A1 | 11/2009 | Kim | |
| 2009/0327296 A1 | 12/2009 | Francis et al. | |
| 2009/0327353 A1 | 12/2009 | Zhuge et al. | |
| 2010/0017384 A1 | 1/2010 | Marinescu | |
| 2010/0017880 A1 | 1/2010 | Masood | |
| 2010/0023999 A1 | 1/2010 | Schran et al. | |
| 2010/0030894 A1 | 2/2010 | Cancel et al. | |
| 2010/0049627 A1 | 2/2010 | Geppert et al. | |
| 2010/0131585 A1 | 5/2010 | Rodrigue et al. | |
| 2010/0146110 A1 | 6/2010 | Christensen et al. | |
| 2010/0146269 A1* | 6/2010 | Baskaran | G06F 21/10 713/165 |
| 2010/0159872 A1 | 6/2010 | Casenave et al. | |
| 2010/0205523 A1 | 8/2010 | Lehota et al. | |
| 2010/0235494 A1 | 9/2010 | Sood et al. | |
| 2010/0251128 A1 | 9/2010 | Cordasco | |
| 2010/0281389 A1 | 11/2010 | Hutchinson | |
| 2010/0318976 A1 | 12/2010 | Everly et al. | |
| 2010/0332962 A1 | 12/2010 | Hammer et al. | |
| 2011/0035486 A1 | 2/2011 | Seolas et al. | |
| 2011/0208850 A1 | 8/2011 | Sheleheda et al. | |
| 2011/0264787 A1 | 10/2011 | Mickens et al. | |
| 2012/0042009 A1 | 2/2012 | Schran et al. | |
| 2012/0284801 A1 | 11/2012 | Goodwin et al. | |
| 2012/0304303 A1 | 11/2012 | Leithead et al. | |
| 2013/0111584 A1 | 5/2013 | Coppock | |
| 2013/0125201 A1 | 5/2013 | Sprague et al. | |
| 2013/0125247 A1* | 5/2013 | Sprague | G06F 21/60 726/28 |
| 2013/0276136 A1 | 10/2013 | Goodwin et al. | |
| 2014/0041048 A1 | 2/2014 | Goodwin et al. | |
| 2014/0215444 A1 | 7/2014 | Voccio et al. | |
| 2014/0304583 A1* | 10/2014 | Fabbri | G06F 17/3089 715/234 |
| 2014/0330767 A1* | 11/2014 | Fowler | G06F 9/466 707/607 |

FOREIGN PATENT DOCUMENTS

| | | | |
|---|---|---|---|
| EP | 1108309 | A1 | 6/2001 |
| EP | 1108312 | A1 | 6/2001 |
| EP | 1145167 | A2 | 10/2001 |
| EP | 1264261 | A2 | 12/2002 |
| EP | 1997041 | A1 | 12/2008 |
| EP | 2141614 | A1 | 1/2010 |
| EP | 2199969 | A1 | 6/2010 |
| EP | 2659367 | A1 | 11/2013 |
| GB | 2412805 | A | 10/2005 |
| WO | 2000079374 | | 12/2000 |
| WO | 2001003023 | A2 | 1/2001 |
| WO | 2001003374 | A1 | 1/2001 |
| WO | 2001003378 | A1 | 1/2001 |
| WO | 2008024706 | A2 | 2/2008 |
| WO | 2008137522 | A2 | 11/2008 |
| WO | 2010119379 | A1 | 10/2010 |

(56) References Cited

FOREIGN PATENT DOCUMENTS

| | | |
|---|---|---|
| WO | 2011084843 A1 | 7/2011 |
| WO | 2012092487 A1 | 7/2012 |

OTHER PUBLICATIONS

John Ennew, Programatically access field data using entity_metadata_wrapper in Drupal, blog post, Deeson.co.uk, 2012.*
Pawel Jurczyk et al, Towards Privacy-Preserving Integration of Distributed Heterogeneous Data, ACM, 2008.*
Mar. 18, 2014—(CN) Official Action—App No. 201180068726.3.
Mar. 21, 2014—(RU) Official Action—App No. 2013135492.
Youchen Zhou., et al. "Protecting Private Web Content from Embedded Scripts", Springer-Verlag, 2011.
Oct. 2, 2014—U.S. Office Action—U.S. Appl. No. 13/833,051.
Peterson, Eric T., "The Coming Revolution in Web Analytics," copyright 2009, pp. 1-18, SAS Institute Inc.
Manion, Josh, "Data Collection Part 1—Single Methodologies," retrieved Nov. 6, 2009, pp. 1-3, Stratigent, LLC.
Resig, John. Website: www.ejohn.org, retrieved Feb. 18, 2010.
Website: www.tealium.com, retrieved Jan. 26, 2010.
Website: www.monetate.com, retrieved Feb. 22, 2010.
Website: www.speed-trap.com, retrieved Jan. 26, 2010.
Website: www.tagman.com, retrieved Jan. 26, 2010.
Website: www.sitetagger.co.uk, retrieved Jan. 26, 2010.
Crockford, Douglas, "The JavaScript Minifier," Dec. 4, 2003, pp. 1-2, website: http://www.crockford.com/javascript/jsmin.html.
Crockford, Douglas, "PHP Adaptation of JSMin" JSMIN_lib.pho (for PHP 4, 5), retrieved on Jan. 26, 2010, pp. 1-10, website: http://javascript.crockford.com/jsmin2.php.txt.
Website: http://developer.yahoo.com/yui/, on Feb. 18, 2010, pp. 1-2.
Website: www.dojotoolkit.org, retrieved Feb. 22, 2010, p. 1.
Website: http://download.dojotoolkit.org/release-1.4.0/dojo.js.uncompressed.js, retrieved Feb. 22, 2010.
Website: www.code.google.com/p/jqueryjs/downloads/detail?name=jquery-1.3.2.js, retrieved Jan. 26, 2010.
Website: www.jquery.com, retrieved Jan. 26, 2010, pp. 1-2.
Website: www.magiq.com, retrieved Feb. 22, 2010, pp. 1.
International Search Report & Written Opinion from PCT Application No. PCT/US10/61997, dated Mar. 3, 2011.
Chenghsien Yu, et al. "A Study of Using Automatic Text Indexing to Analyze Web Browsing Behavior" Proceedings of the 5 World Congress on Intelligent Control and Automations, Jun. 15-19, 2004, Hangzhou, P.R. China.
Yong Tan, et al. "Analysis of a least recently used cache management policy for web browsers" Operations Research, v. 50, No. 2, p. 345-57, Jan. 1999.
Christian von der Weth, et al.,"COBS: Realizing Decentralized Infrastructure for Collaborative Browsing and Search", 2011 Internationl Conference on Advanced Information Networking and Applications, (AINA 2011), p. 617-24, 2011, Mar. 22-25, 2011.
Hui Chen, et al., "Business-to-Consumer Mobile Agent-Based Internet Commerce System (MAGICS)", IEEE Transactions on Systems, Man, and Cybernetics—Part C: Applications and Reviews, vol. 37, No. 6, pp. 1174-1189, Nov. 1, 2007.
W. Ulam, et al. "Technical considerations in remote LIMS access via the World Wide Web", J Autom, Methods Manag. Chem. (UK); v 2005, No. 4, pp. 217-222, Dec. 11, 2005.
Victor Pascual-Cid, "An Information Visualisation System for the Understand of Web Data", VAST'08—IEEE Symposium on Visual Analytics Science and Technology, Proceedings, p. 183-184, Oct. 21, 2008.
Alison Lee, et al. "Browsers to Support Awareness and Social Interaction", IEEE Computer Graphics and Applications, v 24, n 5, p. 66-75, Sep. 1, 2004.
Wikipedia, the free encyclopedia webpage http://en.wikipedia.org/wiki/List_of_HTTP_header_fields#Requests, Aug. 11, 2011, 7 pp.Wikimedia Foundation, Inc.
Overriding a JavaScript function while referencing the original, http://stackoverflow.com/questions/296667/overriding-a-javascript-function-while-referencing-the . . . , pp. 1-3, downloaded Dec. 28, 2010.
The Wall Street Journal, Your Apps Are Watching You, Scott Thurm et al., dated Dec. 17, 2010, http://topics.wsj.com/article/SB10001424052748704694004576020083703574602.html, pp. 1-7, downloaded Dec. 28, 2010.
The Wall Street Journal, Watchdog Planned for Online Privacy, Julia Angwin, dated Nov. 11, 2010, http://online.wsj.com/article/SB10001424052748703848204575608970171176014.html, pp. 1-3, downloaded Dec. 28, 2010.
Google Analytics without javacript!, http://www.vdgraaf.info/google-analytics-without-javascript.html, pp. 1-10, Posted Feb. 28, 2007, downloaded Dec. 24, 2010.
How to add event handler with Prototype new Element( ) constructor?, http://stackoverflow.com/questions/278927/how-to-ad-event-handler-with-prototype-new-element . . . , pp. 1-3, downloaded Dec. 28, 2010.
Dive Into Greasemonkey, 4.22. Overriding a built-in-Javascript method, http://diveintogreasemonkey.org/patterns/override-method/html, pp. 1-2, downloaded Dec. 28, 2010.
Adding elements to the DOM, http://www.javascriptkit.com/javatutors/dom2.shtml, pp. 1-3, downloaded Dec. 28, 2010.
PCT International Search Report for PCT Application No. PCT/US 11/67870 dated May 3, 2012, 11 pages.
Lightweight Self-Protecting JavaScript, Phu H. Phung, et al., ASIACCS; 09, Mar. 10-12, 2009, Sydney, NSW, Australia, © 2009, pp. 47-60.
Examination Report No. 1 for Australian Patent Application No. 2011352038 dated Oct. 4, 2013.
Official Action dated Sep. 30, 2013 in Canadian Patent Application No. 2,823,530.
Aug. 19, 2014—(PCT) International Search Report—App No. PCT/US14/25955.
Sep. 19, 2014—(CN) Office Action—App No. 201180068726.3.
Phu H Phung et al. "Lightweight self-protecting JavaScript", Information, Computer, and Communications Security; Mar. 10, 2009-Mar. 12, 2009, Mar. 12, 2009 (Mar. 12, 2009), pp. 47-60.
Extended European Search Report dated Nov. 3, 2014 in Application No. 11853671.3.
Guha, Salkat et al. "NOYB: Privacy in Online Social Networks" ACM, 2008.
Magazinius, Jonas et al. "Safe Wrappers and Sane Policies for Self Protecting JavaScript" Springer-Verlag, 2012.
Office Action dated May 19, 2015 in U.S. Appl. No. 13/954,532.
Jun. 29, 2015—U.S. Office Action—U.S. Appl. No. 14/679,492.
Sep. 24, 2015—(EP) Examination Report—App 11853671.3.
Nov. 18, 2015—U.S. Final Office Action—U.S. Appl. No. 13/954,532.
Sep. 2, 2016—U.S. Non-Final Office Action—U.S. Appl. No. 13/954,532.
Aug. 26, 2016—(CA) Office Action—App 2823530.
Nov. 17, 2015—(EP) Office Action—App 14770801.0.
Oct. 21, 2016—(EP) Extended European Search Report—App 14770801.0.
Nov. 8, 2016—(EP) Supplementary European Search Report—App 14770801.0.
Jun. 30, 2017—(CN) First Office Action—App 201510173186.5.
Jul. 4, 2017—(CA) Office Action—App 2823530.
Jan. 5, 2016—U.S.—Final Office Action—U.S. Appl. No. 14/679,492.
Ennew, John, "Programatically Access Field Data Using Entity_Metadata_Wrapper in Drupal," blog post, Deeson.co.uk, Jan. 31, 2012.
Apr. 28, 2016—U.S. Notice of Allowance—U.S. Appl. No. 14/679,492.
Nov. 8, 2017—(CN) Search Report—App. 2014800280551—Eng. Tran.

* cited by examiner

ONLINE PRIVACY MANAGEMENT SYSTEM WITH ENHANCED AUTOMATIC INFORMATION DETECTION

CROSS-REFERENCE TO RELATED APPLICATIONS

This application is a continuation of U.S. patent application Ser. No. 14/679,492 entitled "Online Privacy Management System With Enhanced Automatic Information Detection" and filed on Apr. 6, 2015, which is a continuation of U.S. patent application Ser. No. 13/833,051 entitled "Online Privacy Management" and filed on Mar. 15, 2013 and which issued as U.S. Pat. No. 9,003,552 on Apr. 7, 2015, which is a continuation-in-part of U.S. patent application Ser. No. 13/554,603 entitled "Online Privacy Management" and filed Jul. 20, 2012 and which issued as U.S. Pat. No. 8,516,601 on Aug. 20, 2013, which is a continuation of U.S. patent application Ser. No. 13/340,582 entitled "Online Privacy Management" and filed on Dec. 29, 2011 and which issued as U.S. Pat. No. 8,261,362 on Sep. 4, 2012, which claims priority to U.S. Provisional Application No. 61/428,560 entitled "Online Privacy Management System" and filed on Dec. 30, 2010 including its concurrently-filed appendices. Each of the aforementioned patents and patent applications are herein incorporated by reference in their entirety.

TECHNICAL FIELD

Aspects of the disclosure generally relate to management, regulation, control, and/or auditing of analytics and other data to be collected from a user's terminal. In particular, various aspects of the disclosure discuss features of an online privacy management system.

BACKGROUND

Web pages are generally written in Hypertext Markup Language (HTML). They are written using HTML elements that include "tags" surrounded by angle brackets; information in the tag tells the web browser how to interpret the HTML element (e.g., as text, for insertion of an image into the webpage, for running a script, etc.). These tags can, among other things, include or can load scripts in languages such as JavaScript™.

Meanwhile, web analytics is a field in which data about customers (e.g., customer behavior, customer location, etc.) is collected and analyzed for a variety of purposes. To obtain data for web analytics, a population of users visits a web page and/or starts an application that causes certain program instructions to be executed. Usually, data is collected for web analytics purposes through a variety of mechanisms, including the setting of a cookie and/or by running scripts in the HTML document. The scripts may perform a variety of functions, including grabbing variables from the document object model (DOM) and/or sending back an image request to a data collection server either internally or externally hosted.

The program instructions for web analytics are generally authored and run by a variety of vendors, including Omniture™, Google™, Yahoo™, and Webtrends™ among others, in order to be able to capture data such as web page load times, "mouse overs" (i.e., moving a mouse over a particular object on the web page), and the page requestor's IP address. A medium complexity web page may include 5-10 tags with a reference to computer scripts that are run on servers managed by different vendors.

When a marketer assigned to manage web analytics for an organization decides that she wants to change the code/tagging to measure and analyze different features, the process is often tedious and challenging. In many situations, to perform this update, the marketer must create a new custom variable in the program instructions, define what the new variable is, and specify what data the modified code must capture for the web page. Since the marketer is generally not skilled in how to perform these modifications, she must interface with her information technology (IT) department or other similar agency. Sometimes, even the IT department may not adequately understand the syntax of the web analytics program instructions to properly modify the code, especially given that the myriad web analytics vendors, advertisers, survey researchers, and marketers all have their own custom computer code for effectuating the collection of data for analysis. In other situations, the IT department may not have the appropriate bandwidth to modify the code for deployment on schedule (e.g., for an advertisement campaign deadline, etc.). These problems are only exacerbated when a client's website has many pages and/or many different types of program instructions for collecting various data about a user.

Some web analytics tools use the HTML image element and/or JavaScript to assist in collecting analytics data. An analytics data transmission may be masked as an image element that does not add the image element to the webpage's DOM. Instead, the image element may be for a one pixel by one pixel transparent image by the analytics vendor for the purposes of collecting data related to the webpage visitor. For example, the "src" attribute may be set to a URL with an appended string of parameter name-value pairs (e.g., www.hostname.com/theImage.gif?data=something&data2=someMoreData). Once the "src" attribute is set, the browser may attempt to locate and retrieve the image at the URL location. In doing so, the analytics data may be obtained at the remote server as these name-value pairs. This is one method frequently used by web analytics vendors for collecting data.

Some companies may outsource their web analytics to one or more third party vendors (e.g., web analytics vendors, voice of consumer (VOC), ad servers, testing solutions, targeting tools, pay per click (PPC) tools, affiliate tracking, etc.) that specialize in web analytic, web advertising, and other web-related services. Meanwhile, these third party vendors may contract/work with one or more fourth party vendors to assist in collecting data, displaying/selecting advertising images, analyzing collected data, etc. For example, a fourth party vendor may be executing code on the companies' webpages or collecting analytics data from the webpages. This fourth party vendor may be unknown to the website owner or might not be an industry-verified vendor. Some fourth party vendors might not respect DNT (Do-Not-Track) Headers, unbeknownst to the website owner/company. In some case, the fourth party vendor may even share the information collected about visitors with fifth party vendors, again unbeknownst to the website owner/company. As such, data may be collected and distributed from the website to domains and vendors unknown to the website administrator. Privacy and other issues (e.g., technical issues) may arise in regulating, controlling, and/or auditing the dissemination of the data. This disclosure provides an online privacy management system that, among other things, permits users (e.g., Chief Privacy Officers of a company, etc.) to better control/regulate/manage consumer data and privacy.

BRIEF SUMMARY

Aspects of the disclosure address one or more of the issues mentioned above by disclosing methods, computer readable media, and apparatuses for an online privacy management system and related systems. In one example, a system may assist in managing, regulating, controlling, and/or auditing of transmission of collected data (e.g., web analytics or other data) collected from a user's terminal to external servers. The privacy management system may simplify the process by which users (e.g., Chief Privacy Officers (CPOs), webpage visitors, etc.) can oversee with whom and/or what information is being collected for transmission to third-party and fourth-party computer servers.

In one example in accordance with aspects of the disclosure, a privacy management system's non-transitory computer-readable medium storing scripting code written in a programming language that lacks functionality to override a setter function of a variable corresponding to a uniform resource locator stored in a predefined object, wherein when the scripting code is executed by a processor of a computing device located remotely from the privacy management system, the scripting code causes the remote computing device to perform numerous steps, is disclosed. In some examples, the steps may include one or more of the steps described herein. For example, the remote computing device may perform one or more steps of: monitoring in realtime, using the processor, a document object model of a webpage to identify updates to the document object model that cause modification of the uniform resource locator stored in the predefined object; comparing in realtime, using the processor, the modified uniform resource locator to a predetermined list of values; and/or blocking in realtime, using the processor, transmission of web analytics data to a server associated with the modified uniform resource locator, based on the comparing. The remote computing device may also analyze the analytics data to determine whether it includes private information. Thus, in addition to, or instead of, checking uniform resource locators, the remote computing device may evaluate the analytics data itself and determine whether to block its transmission based on results of evaluating the analytics data. In addition, in some examples, the remote computing device may also perform one or more steps of: defining, using the processor, a new object, wherein the new object is a wrapper object overriding the predefined object; and/or creating the new object in the document object model, using the processor, wherein the new object is configured to store at least an uniform resource locator. One or more of the steps described above may be optional or may be combined with other steps. In some examples, the monitoring step may include causing the processor to check for updates to the uniform resource locator stored in the new object.

In another example in accordance with aspects of the disclosure, a computerized apparatus comprising: a processor configured to transmit, over a network to a remote computing device, scripting code written in a programming language that lacks functionality to override a setter function of a first attribute in a predefined object; and a memory storing the scripting code, which when executed by the remote computing device, causes the remote computing device to perform numerous steps is disclosed. In some examples, the steps may include one or more of the steps described herein. For example, the remote computing device may: define a new object comprising a wrapper object overriding the predefined object, including configuring a processor of the remote computing device to create, in a memory of the remote computing device, the new object instead of the predefined object in response to a request to create the predefined object; check on a regular interval for updates to a second attribute stored in the new object, wherein the second attribute is associated with the first attribute stored in the predefined object; compare the second attribute to a predetermined list of values, responsive to determining that the second attribute stored in the new object has been updated by other scripting code executing on the remote computing device, wherein the other scripting code is transmitted from a remote third-party server different from the computerized apparatus; and/or block the other scripting code from causing the remote computing device to send collected data, responsive to the comparing of the second attribute to the predetermined list of values. In addition, in some examples, the collected data may comprise web analytic data, the predefined object may be a hypertext markup language image object, the first attribute and second attribute may be configured to store uniform resource locators, and/or the blocking of the other scripting code may be performed in realtime. One or more of the steps described above may be optional or may be combined with other steps. Furthermore, in some examples in accordance with aspects of the disclosure, the predetermined list of values may comprise at least one of: a blacklist and a whitelist, wherein the other scripting code may be blocked responsive to at least one of: determining that the second attribute of the new object is in the blacklist, and determining that the second attribute of the new object is not in the whitelist.

In yet another example in accordance with aspects of the disclosure, a method of controlling distribution of web analytic data using an online privacy management system is disclosed. In some examples, the method may include one or more of the steps described herein. For example, the method may include one or more steps of: receiving a page from a remote server corresponding to a first domain, wherein the page comprises at least a plurality of elements that cause a computer processor to send data to a domain different from the first domain; processing, using the computer processor, a first element of the plurality of elements of the page, wherein the first element stores a first uniform resource locator referencing a privacy management system server storing scripting code for privacy management; sending, using the computer processor, a request to the privacy management system server for the scripting code for privacy management; executing, using the computer processor, the scripting code for privacy management to at least define an overridden object, wherein the overridden object is a wrapper object overriding a predefined object; processing, using the computer processor, a second element of the plurality of elements after the executing of the scripting code for privacy management, wherein the second element is configured to cause creation of the predefined object configured to send data to a domain different from the first domain and different from the privacy management system server; creating, in a computer memory using the computer processor, the overridden object instead of the predefined object corresponding to the second element, wherein the overridden object is configured to store at least an uniform resource locator; storing in the overridden object a second uniform resource locator received from the second element, wherein the second uniform resource locator corresponds to a second domain; creating, in the computer memory using the computer processor, the predefined object, wherein the predefined object is configured to store at least an uniform resource locator; causing, by the scripting code for privacy management, the computer processor to check for updates to the uniform resource locator stored in the overridden object; in response to determining that the uniform resource locator of the overridden object has been updated to the second uniform resource locator, comparing, by the scripting code for privacy management, the second uniform resource locator stored in the overridden object to a predetermined list of domains; in response to determining that the second uniform stored in the overridden object is in the predetermined list, blocking, by the scripting code for privacy management, the second element from configuring the page to send collected data to the second uniform resource locator, wherein the collected data comprises web analytic data; and/or in response to determining that the second uniform stored in the overridden object is not in the predetermined list, updating, by the scripting code for privacy management, the uniform resource locator stored in the predefined object to the second uniform resource locator. In addition, in some examples, the blocking may be performed in realtime and comprise one or more steps of: modifying the second uniform resource locator to clear the collected data; and/or storing the modified second uniform resource locator in the predefined object. In some examples, the computer processor may check for updates to the second uniform resource locator of the overridden object on a predetermined interval, and not using a push model. In addition, in some examples, the second element may be a script tag in hypertext markup language and include a fourth uniform resource locator, and the method may also include one or more steps of: causing, by the second element, an update of the second uniform resource locator stored in the overridden object to the fourth uniform resource locator, wherein the fourth uniform resource locator is in the predetermined list of domains; recording in a log the second uniform resource locator that corresponds to the second domain; and/or recording in the log in association with the second uniform resource locator, at least the fourth uniform resource locator. One or more of the steps described above may be optional or may be combined with other steps. Furthermore, in some examples, the two steps of recording in the log may include reading a stack trace using the computer processor to obtain information for the log file.

In one example in accordance with aspects of the disclosure, a privacy management system's computer-readable storage medium storing computer-executable instructions, which when executed by a processor of a computing device located remotely from the privacy management system, causes the remote computing device to perform numerous steps is disclosed. In some examples, the steps may include one or more of the steps described herein. For example, the remote computing device may perform one or more steps to: define an overridden object, wherein the overridden object is a wrapper object overriding a predefined object, wherein the overridden object is configured to store at least an uniform resource locator, wherein the predefined object is configured to store at least an uniform resource locator; and wherein the defining an overridden object configures the processor to create, in a memory, the overridden object instead of the predefined object in response to a request to create the predefined object; create, in the memory, the predefined object, wherein the predefined object is associated with the overridden object; cause the processor to check for updates (e.g., on a predetermined interval, using a push model, etc.) to the uniform resource locator stored in the overridden object; compare (e.g., in realtime) the updated uniform resource locator stored in the overridden object to a predetermined list of domains, in response to determining that the uniform resource locator of the overridden object has been updated; and/or based on results of the compare, performing one of: (i) modify the updated uniform resource locator stored in the overridden object to remove collected data and store the modified updated uniform resource locator in the predefined object, and (ii) store the updated uniform resource locator in the predefined object. In some examples in accordance with aspects of the disclosure, additional steps may be performed to: create, in the memory, the overridden object, in response to a request to create the predefined object; and/or compare the updated uniform resource locator stored in the overridden object to the predetermined list of domains. One or more of the steps described above may be optional or may be combined with other steps. In one example, the computer-executable instructions may be written in a programming language that lacks functionality to override a setter function of a variable corresponding to the uniform resource locator stored in the predefined object. Furthermore, in some examples, the modified updated uniform resource locator may be a portion of the updated uniform resource locator modified with a default value. In addition, in some examples, the predetermined list of domains may include a whitelist and/or a blacklist, and the updated uniform resource locator may be stored in the predefined object based on the updated uniform resource locator being a part of the whitelist and/or not part of the backlist.

In addition, in accordance with aspects of the disclosure, the methods, apparatus, and computer-readable medium described herein may further include the steps to cause a remote computing device to: define an overridden method overriding a predefined method, wherein the defining an overridden method configures the processor to execute, by the processor, the overridden method instead of the predefined method in response to a request to execute the predefined method; cause the processor to execute the predefined method subsequent to execution of the overridden method (e.g., using the modified uniform resource locator as the input parameter to the predefined method); receive an uniform resource locator corresponding to a third domain as an input parameter to the predefined method, and wherein the third domain is different from a domain corresponding to the privacy management system server; compare the received uniform resource locator to the predetermined list of domains; and/or in response to determining that the received uniform resource locator stored is in the predetermined list, modify the uniform resource locator stored to remove the collected data. One or more of the steps described above may be optional or may be combined with other steps. In some examples, the predefined method may be a constructor method corresponding to an image element in hypertext markup language, and the predefined method may be at least one of: an appendChild function, an insertBefore function, a replaceChild function, and a write function.

In one example in accordance with aspects of the disclosure, a privacy management system's computer-readable storage medium storing computer-executable instructions, which when executed by a processor of a computing device located remotely from the privacy management system, causes the remote computing device to perform numerous steps is disclosed. In some examples, the steps may include one or more of the steps described herein. For example, the remote computing device may perform one or more steps to: display the predetermined list of domains, wherein the predetermined list is configured to support regular expressions with wildcards; generate a graphical user interface configured to permit updates to the predetermined list by adding and deleting entries in the predetermined list; send the updated predetermined list to the privacy management server for storage; generate an graphical user interface comprising an input means configured to enable scripting code for privacy management; send a state of the input means to the privacy management server for storage; before the defining of the overridden object, determine that the scripting code for privacy management is disabled; reconfigure the processor to no longer create the overridden object instead of the predefined object in response to a request to create the predefined object; reconfigure the processor to no longer cause the processor to check for updates to the uniform resource locator stored in the overridden object; display a list of one or more domains providing third-party scripting code to the remote computing device, wherein the third-party scripting code is configured to cause the remote computing device to send the collected data to a remote server; determine that the remote server is associated with a domain on the blacklist; display the domain on the blacklist that corresponds to the domain providing third-party scripting code; display whether the processor of the remote computing device is configured to block execution of the third-party scripting code; determine a location of the remote computing device; identify a privacy rule corresponding to the location of the remote computing device; and/or configure the processor to block sending of the collected data when the privacy rule has been met. One or more of the steps described above may be optional or may be combined with other steps.

This summary is provided to introduce a selection of concepts in a simplified form that are further described below in the detailed description. The summary is not intended to identify key features or essential features of the claimed subject matter, nor is it intended to be used to limit the scope of the claimed subject matter. Moreover, one or more of the steps and/or components described above may be optional or may be combined with other steps.

BRIEF DESCRIPTION OF THE FIGURES

Systems and methods are illustrated by way of example and are not limited in the accompanying figures in which like reference numerals indicate similar elements and in which.

Figure 6:
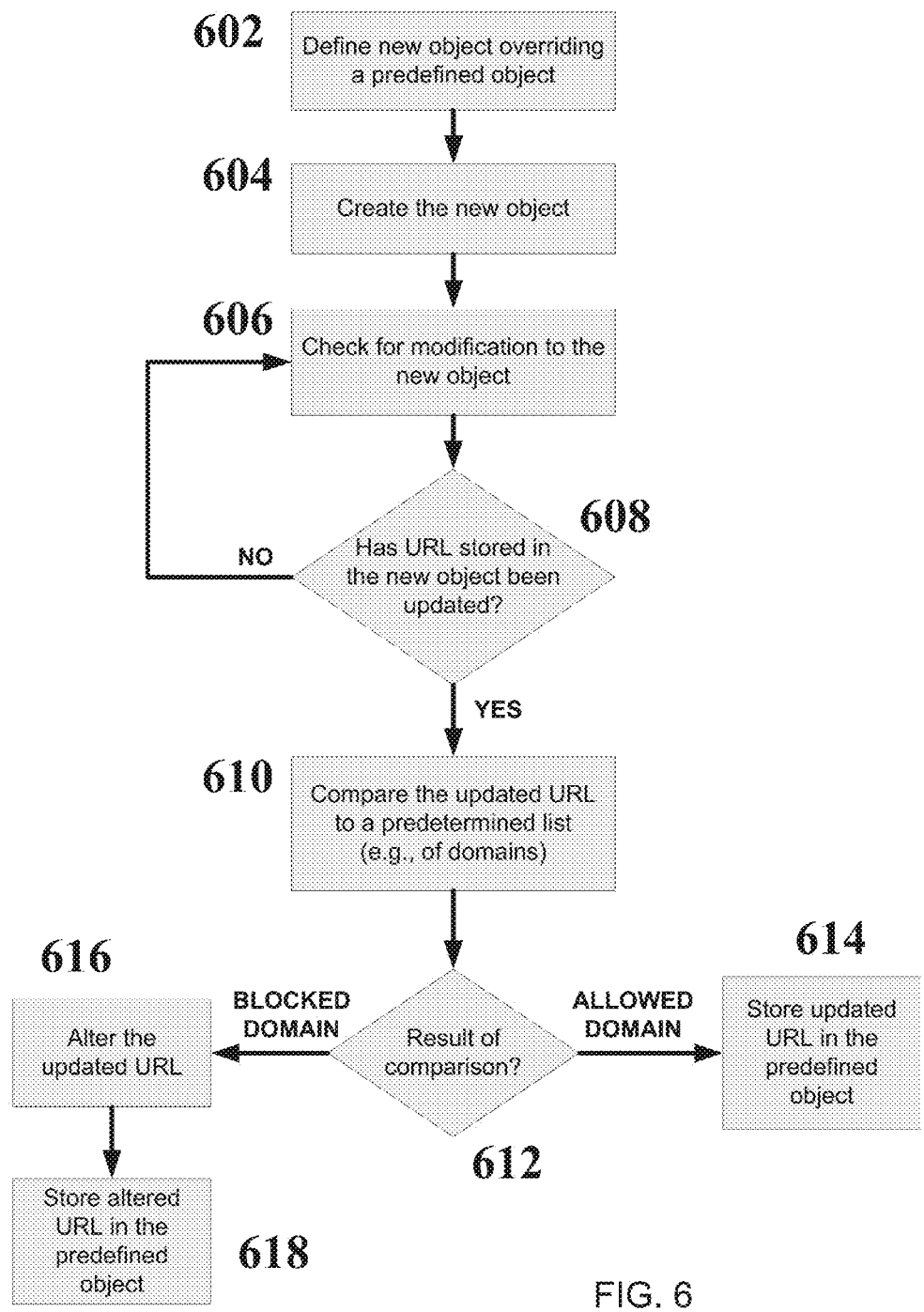
Figure 7A:
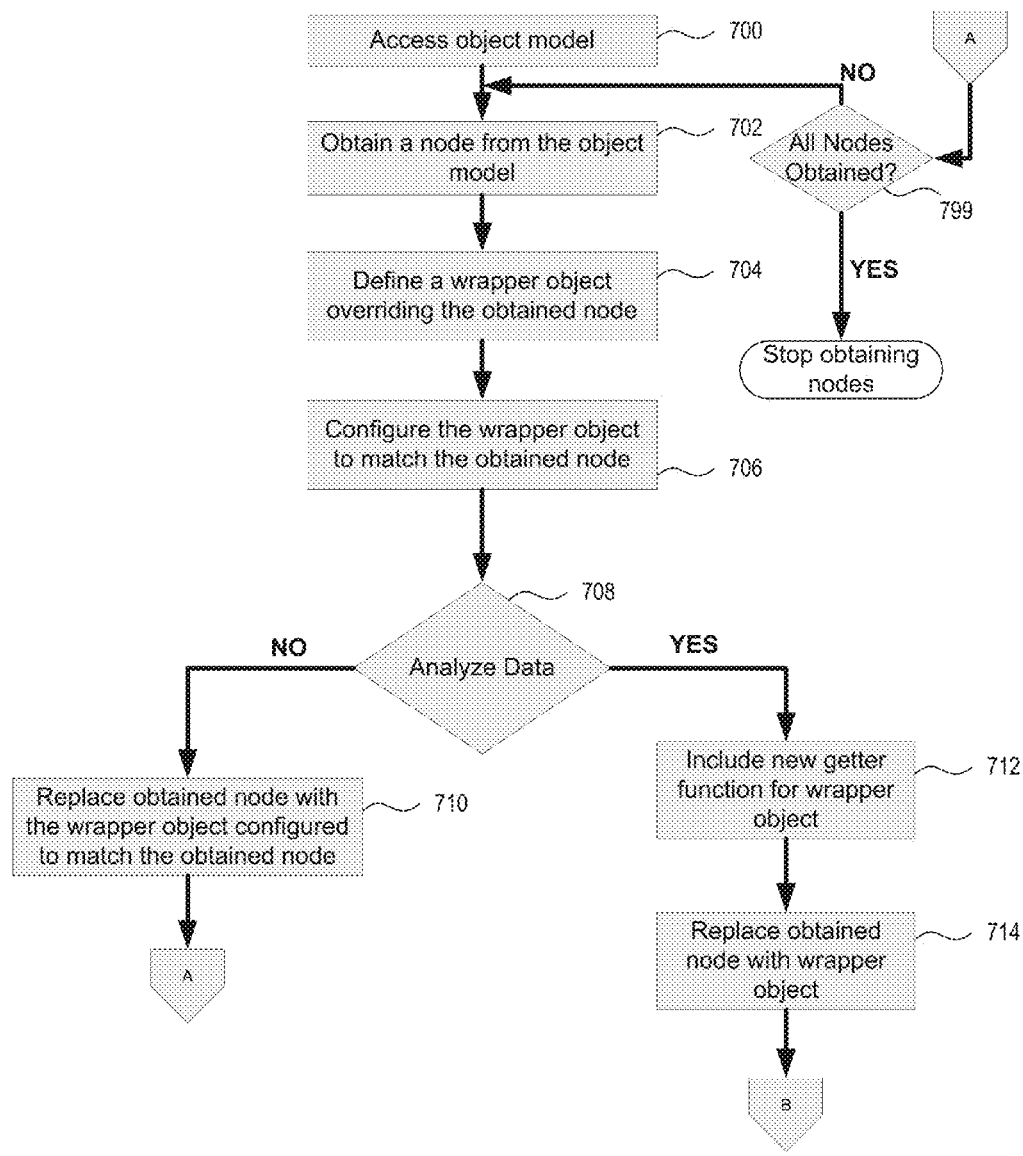
Figure 7B:
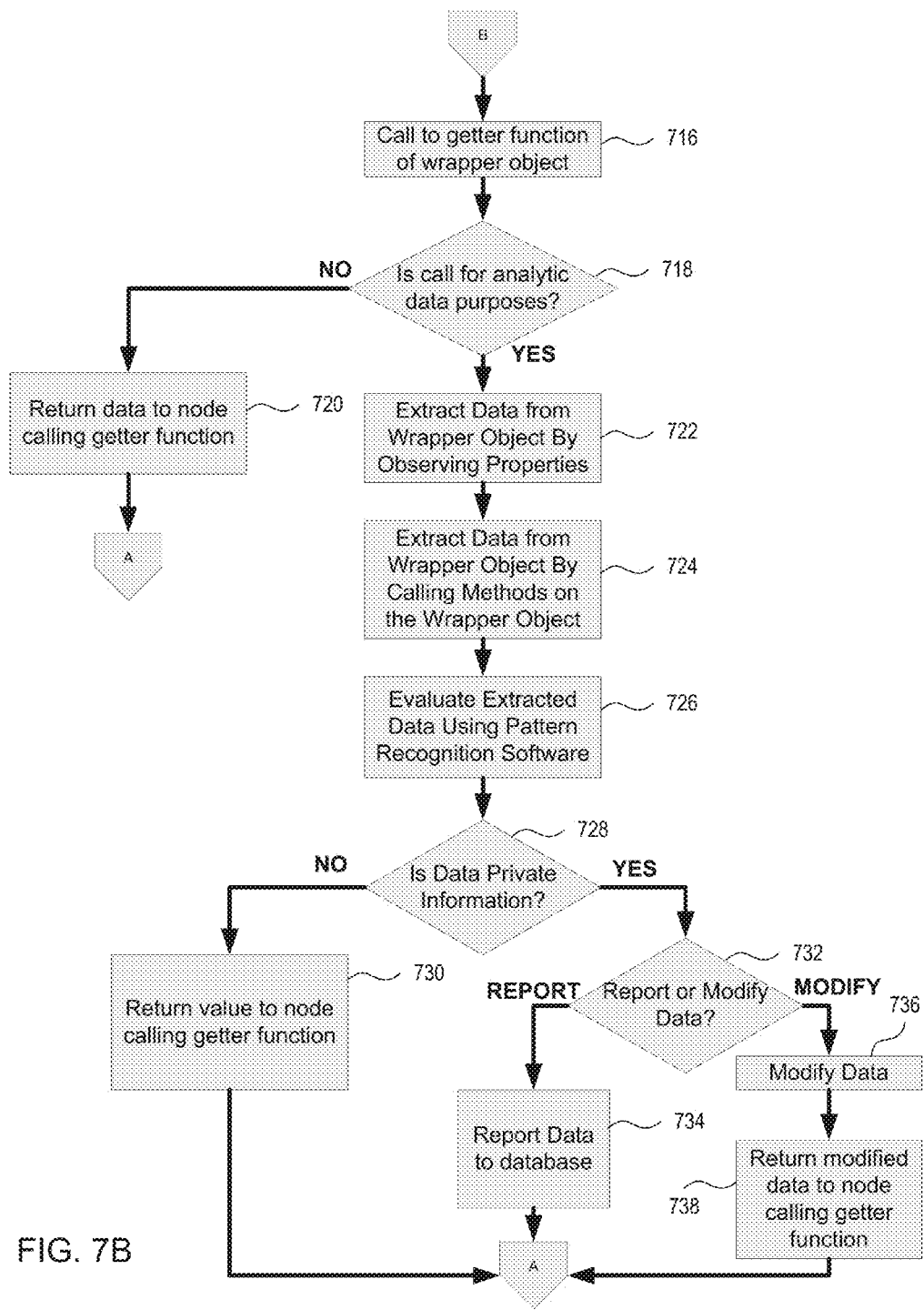
Figure 8A:
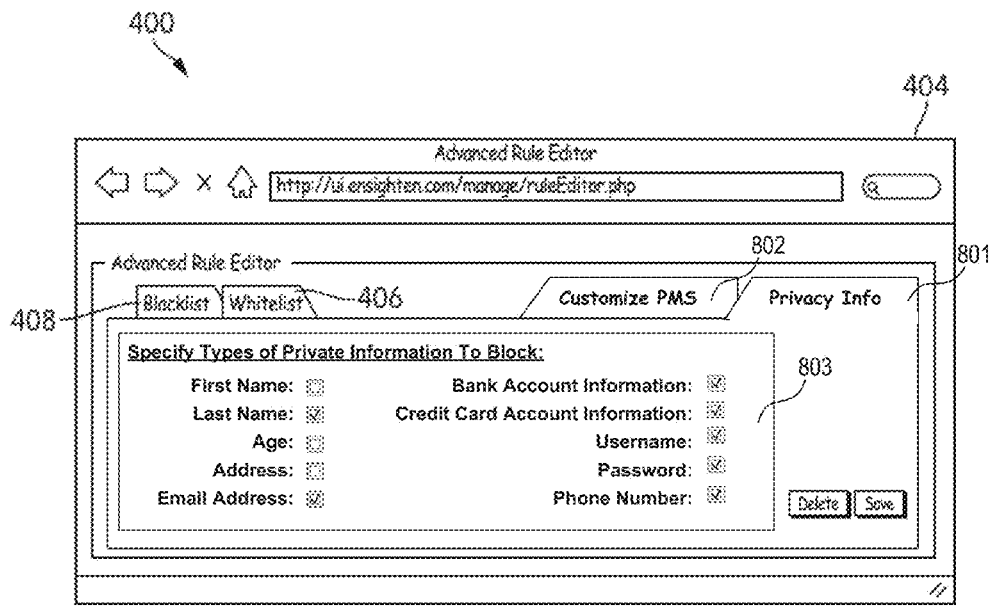
Figure 8B:
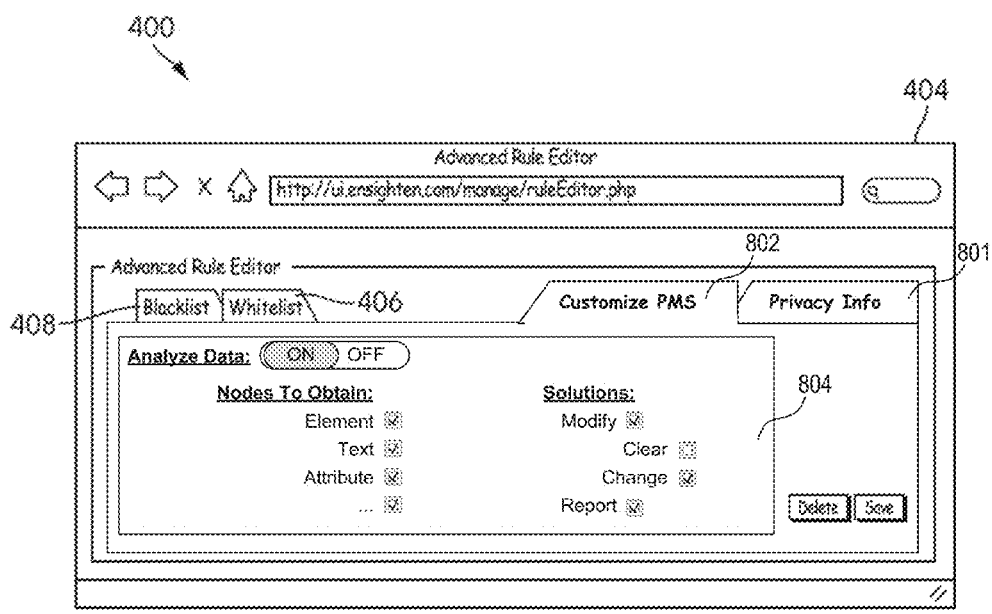
Figure 9A:
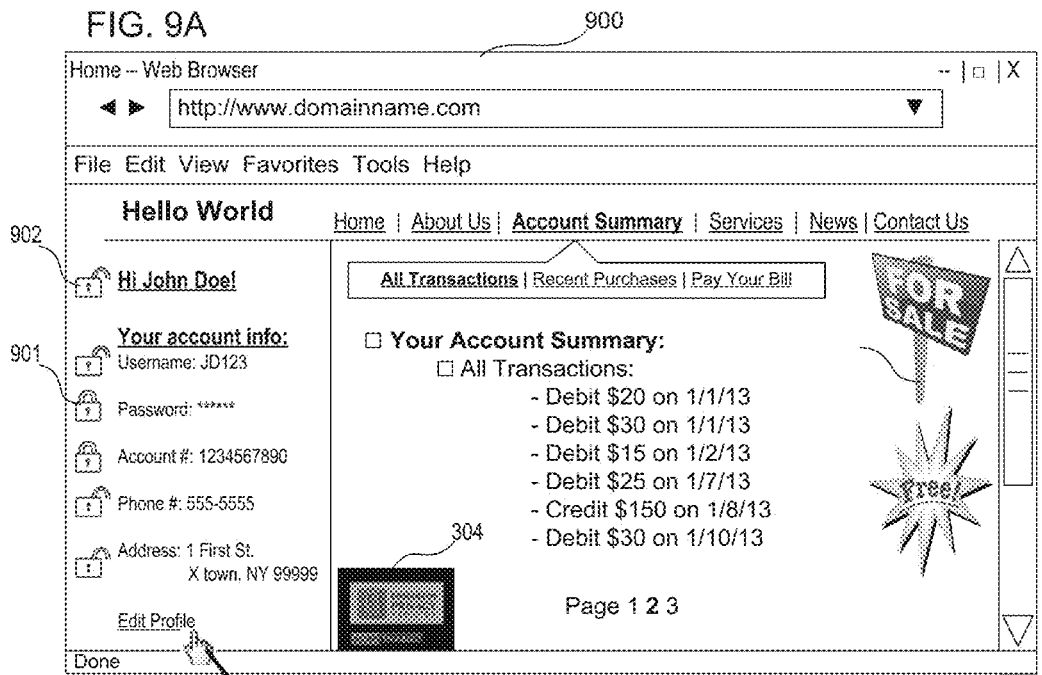
Figure 9B:
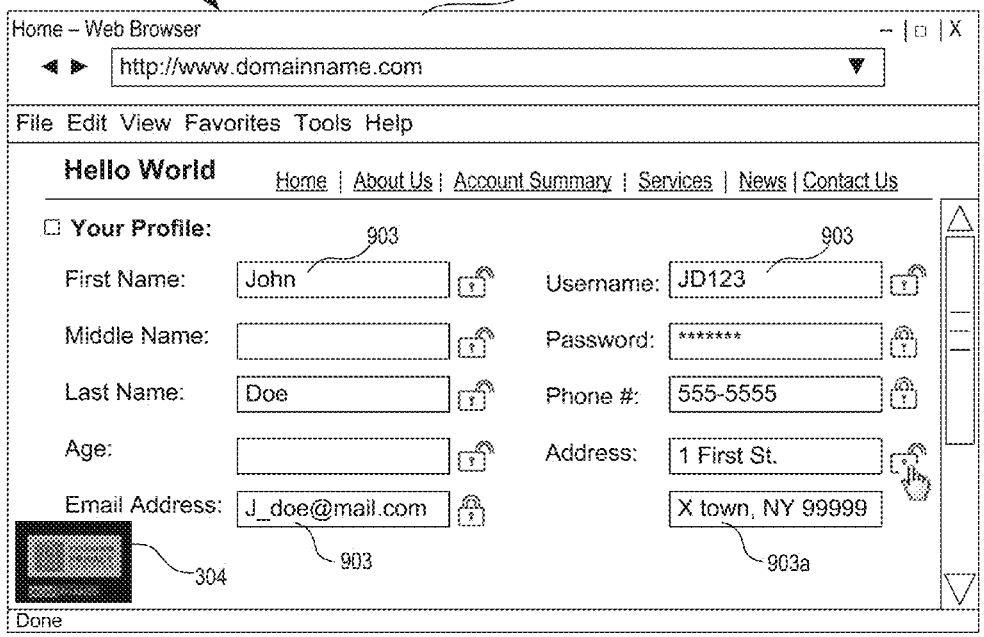

Provisional Application Ser. No. 61/428,560) illustrate a high-level diagram of a webpage with numerous web vendors, including third party and fourth party vendors, interacting with the webpage, in accordance with various aspects of the disclosure;

FIG. 6 illustrates a flowchart of a method related to an online privacy management system in accordance with various aspects of the disclosure;

FIGS. 7A and 7B illustrate a flowchart of another method related to an online privacy management system in accordance with various aspects of the disclosure;

FIGS. 8A and 8B illustrate additional aspects of a dashboard of the privacy management system; and FIGS. 9A and 9B illustrate additional icons that may be used in conjunction with the privacy management system.

DETAILED DESCRIPTION

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

A privacy management system (PMS) is disclosed for a Chief Privacy Officer (CPO) or other user to use in, among other things, monitoring and/or controlling in realtime the flow of data (e.g., outflow) about the user and his/her online experience. The PMS may provide a dashboard displaying a whitelist and/or blacklist indicating what destinations/sources are blocked or allowed. The dashboard may also include settings that a user can set to create rules for blocking private information from being transmitted as analytics data. The PMS includes browser-client scripting code and may also include a PMS-certified verification icon as well as lock and unlock icons for display on webpages being monitored/controlled in realtime by the PMS.

Systems and methods are disclosed directed at steps performed by a web browser application while interacting with a webpage that is monitored by a privacy management system (PMS). The browser may receive a page (e.g., HTML page) comprising scripting code (e.g., Javascript) from multiple sources (i.e., privacy management server, third-party analytics vendors, third-party targeted ads vendors, etc.) The browser may execute the scripting code, thus causing the plurality of elements (e.g., scripting tags, image tags, etc.) on the page to send data to different domains. The scripting code may, in some examples, override particular standard methods (e.g., appendChild method) and constructor methods for particular page elements (e.g., image element). The overridden method may be executed at the browser (i.e., on the user's device) such that communication between the browser and particular domains or subdomains may be blocked or allowed. Additionally, or alternatively, the overridden method may block communications based on whether the communications include private information. In some examples, the PMS may implement rules to determine whether to block or allow the communication, or may rely on default rules. Moreover, in some examples, the PMS may use pattern recognition software to detect private information within analytics data. The result of monitoring and control by a PMS may be displayed on an (online) dashboard for a CPO or other person. The PMS may generate messages in response to particular events (e.g., blocking) occurring in realtime.

In addition, systems and methods are disclosed directed at a remote server that provides the scripting code that is executed to enable the PMS to manage and control the flow (e.g., outflow) of data. The code may include Javascript code that overrides existing Javascript methods and/or constructors for Javascript objects, and is referred to herein as an "overridden method" or "overridden object." The existing method or object that is being overridden is referred to herein as the "predefined method" or "predefined object."

In addition, systems and methods are disclosed directed at a universal PMS-certified verification icon that may be provided and displayed on a webpage to indicate that the webpage is compliant with particular privacy policies. The icon may be provided by the PMS and information about privacy preferences/settings for the PMS to implement may be stored in the PMS system. Alternatively, the privacy preferences/settings information may be stored on the client's device (e.g., as a cookie) or other location. Systems and methods are disclosed for providing lock and unlock icons for various information on a page so that users viewing the page may see what information will be blocked from being transmitted as analytics data. Further, systems and methods are disclosed for allowing users (e.g., CPOs, webpage visitors, etc.) to select the lock and unlock icons so that users may control what information is being blocked.

In accordance with various aspects of the disclosure, a privacy management system (PMS) is disclosed for, among other things, enhancing control over consumer data collection and online privacy. A Chief Privacy Officer (CPO), or anyone interested in managing the collection and distribution of information about an online user (e.g., web analytics, data mining, etc.) may use the PMS to monitor, collect information about, report about, and/or block in realtime the distribution of data about users. In one embodiment, the PMS may be used in conjunction with Ensighten's "Ensighten Manage"™ product for tag management. In another embodiment, aspects of the PMS may be used in conjunction with other web analytics and/or tag management products readily available in the market, such as those by ObservePoint™, Google™, Site Catalyst™, and others. In addition, the PMS may provide a dashboard displaying a whitelist and/or blacklist indicating what destinations/sources are blocked or allowed as well as windows for allowing a user to customize what private information should be blocked. The PMS includes browser-client scripting code and may also include a PMS-certified verification icon, a lock icon, and unlock icon for display on webpages being monitored/controlled in realtime by the PMS.

Figure 1:
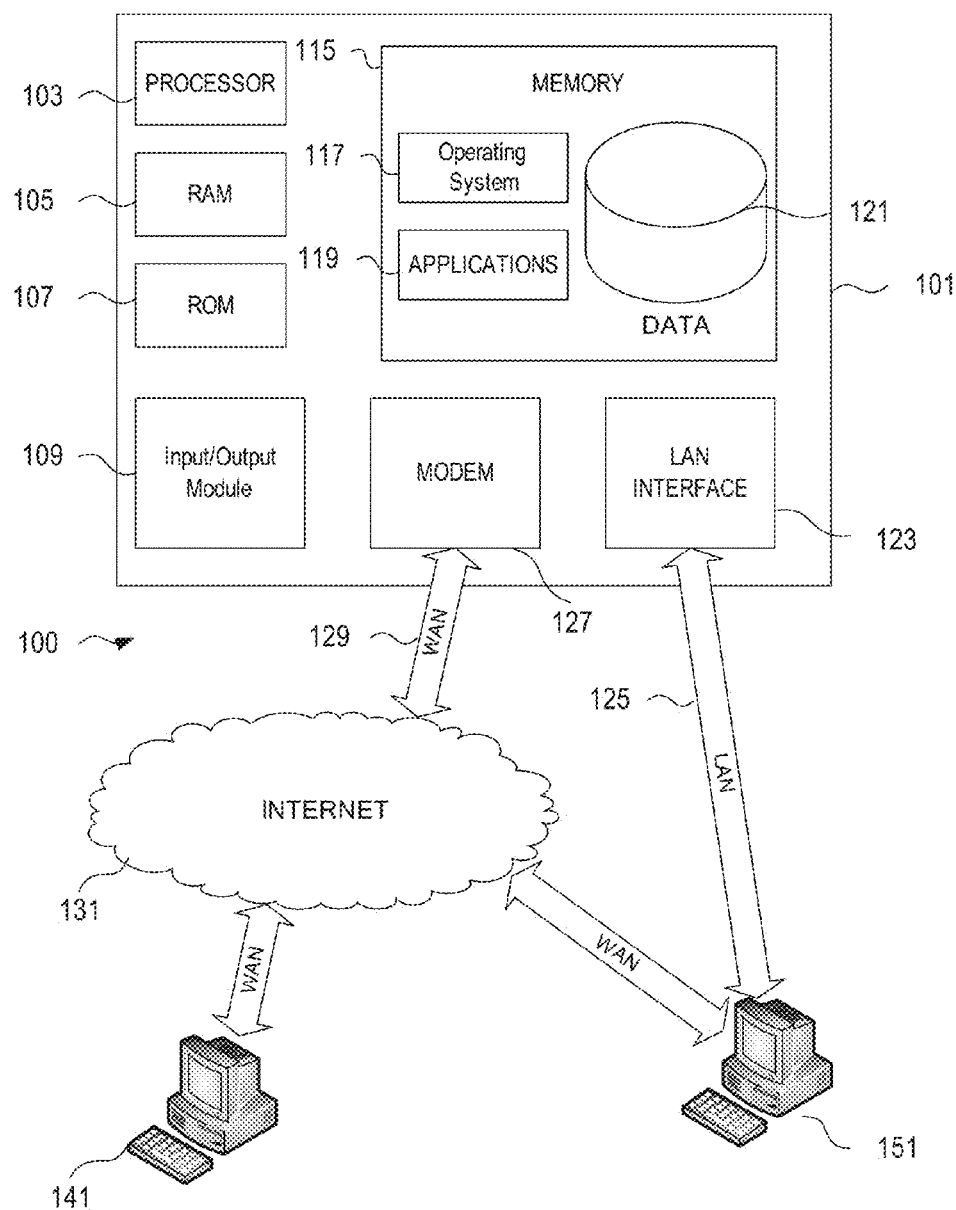
FIG. 1 shows an illustrative operating environment in which various aspects of the disclosure may be implemented.

FIG. 1 describes, among other things, an illustrative operating environment in which various aspects of the disclosure may be implemented (e.g., see Appendix A in U.S. Provisional Application Ser. No. 61/428,560). FIG. 1 illustrates a block diagram of a tag/content manager 101 (e.g., a computer server) in communication system 100 that may be used according to an illustrative embodiment of the disclosure. The manager 101 may have a processor 103 for controlling overall operation of the manager 101 and its associated components, including RAM 105, ROM 107, input/output module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 to provide instructions to processor 103 for enabling manager 101 to perform various functions. For example, memory 115 may store software used by the manager 101, such as an operating system 117, application programs 119, and an associated database 121. Processor 103 and its associated components may allow the manager 101 to run a series of computer-readable instructions to deploy program instructions according to the type of request that the manager receives. For instance, if a client requests that program instructions for capturing mouse movements for complete session replay be executed, manager 101 may transmit the appropriate instructions to a user's computer when that user visits the client's website.

The manager 101 may operate in a networked environment supporting connections to one or more remote computers, such as terminals 141 and 151. The terminals 141 and 151 may be personal computers or servers that include many or all of the elements described above relative to the manager 101. Alternatively, terminal 141 and/or 151 may be part of a "cloud" computing environment located with or remote from manager 101 and accessed by manager 101. The network connections depicted in FIG. 1 include a local area network (LAN) 125 and a wide area network (WAN) 129, but may also include other networks. When used in a LAN networking environment, the manager 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the manager 101 according to an illustrative embodiment of the disclosure may include computer executable instructions for invoking functionality related to delivering program instructions and/or content.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
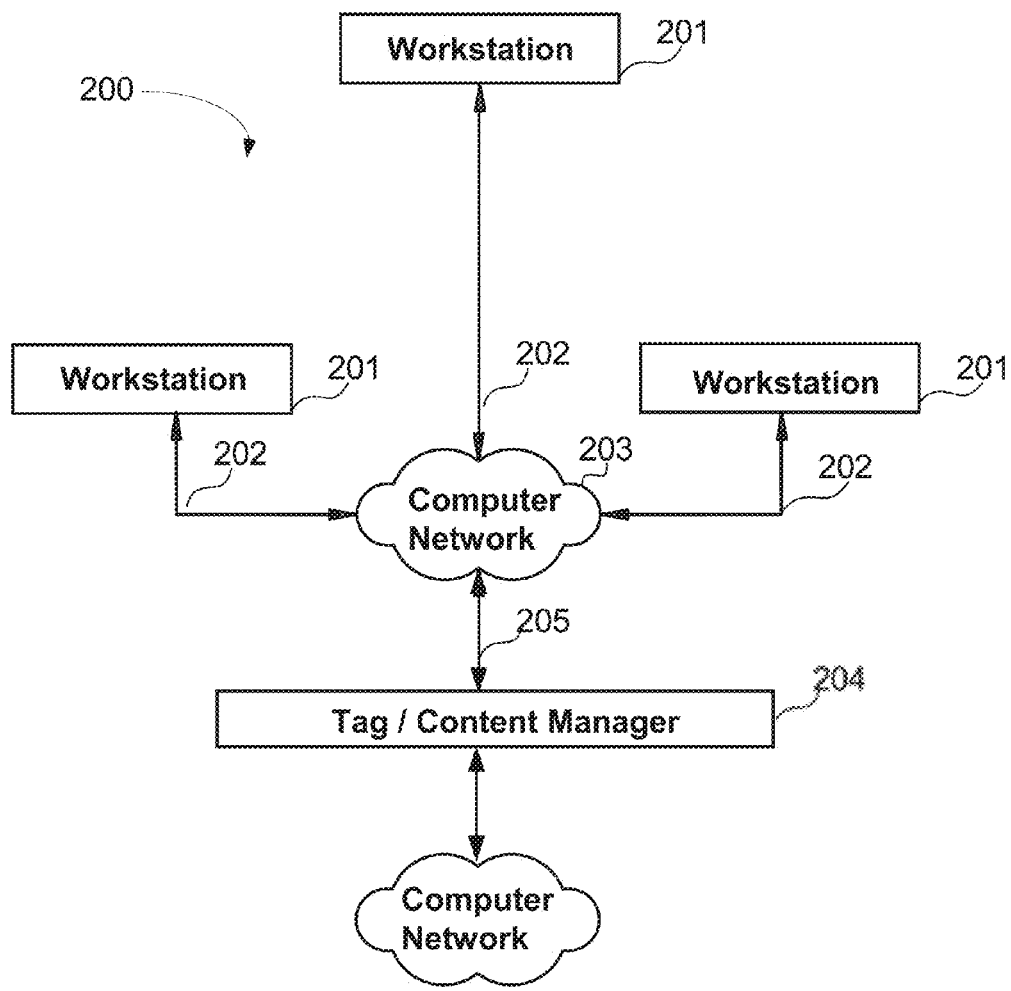
FIG. 2 is an illustrative block diagram of workstations and servers that may be used to implement the processes and functions of certain aspects of the disclosure.

Referring to FIG. 2, that figure describes an illustrative block diagram of workstations and servers that may be used to implement the processes and functions of certain aspects of the disclosure (e.g., see Appendix A in U.S. Provisional Application Ser. No. 61/428,560). FIG. 2 describes an illustrative system 200 for implementing methods according to the present disclosure is shown. As illustrated, system 200 may include one or more workstations 201. Workstations 201 may be local or remote, and are connected by one or more communications links 202 to computer network 203 that is linked via communications links 205 to tag/content manager 204. In certain embodiments, workstations 201 may be different storage/computing devices for storing and delivering client-specific program instructions or in other embodiments workstations 201 may be user terminals that are used to access a client website and/or execute a client-specific application. In system 200, manager 204 may be any suitable server, processor, computer, or data processing device, or combination of the same. Throughout this disclosure, tag/content manager 204 will be used to reference both the server/terminal that stores program instructions for tag/content management and the tag/content management program instructions themselves.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

The steps that follow in the Figures may be implemented by one or more of the components in FIGS. 1 and 2 and/or other components, including other computing devices.

Taking as an example the Ensighten Manage™ product, aspects of which are described in Appendix A of U.S. Provisional Application Ser. No. 61/428,560, a webpage author may include Ensighten's code (or other similar code 510A) (e.g., a single consistent line of Javascript code) at the top of the webpages 502 on their web site servers 504. This code permits the management of content/tags associated with the webpage. For example, the Ensighten Manage™ product may be used to collect analytics data about the movement of the webpage visitor's mouse over a particular object (e.g., "mouse over") and transmit this data to a remote server (e.g., Ensighten's database 506, the webpage owner's database 504, or other servers 508) for storage/analysis. Assuming the webpage owner is operating the tag management software, they are directly managing what data is collected about their webpage visitors and where that data is distributed. In such a scenario, a CPO might not need a PMS to monitor and regulate (e.g., block) the flow of analytic data about their website visitors.

Figure 5A:
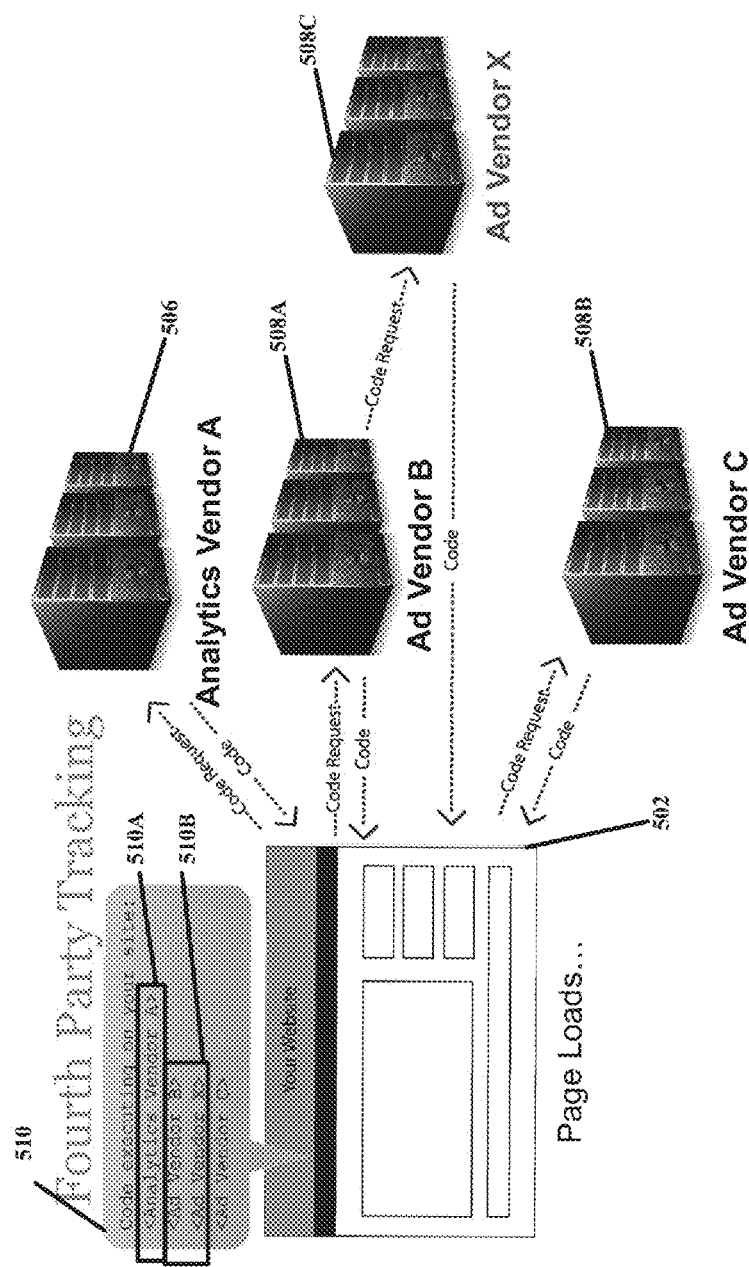
FIGS. 5A, 5B, and 5C (all based on, inter alia, Appendix C in U.S.
Figure 5B:
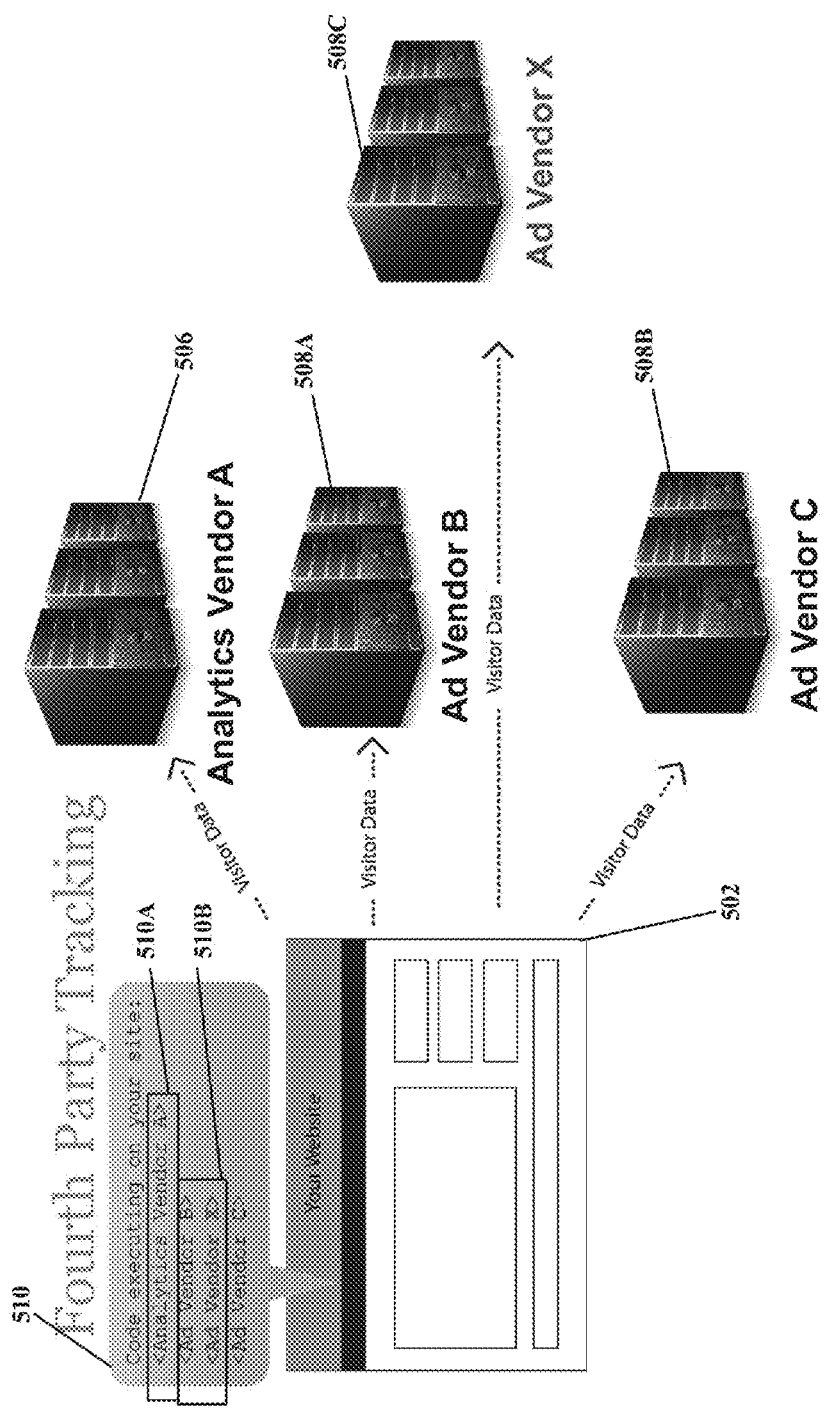
Figure 5C:
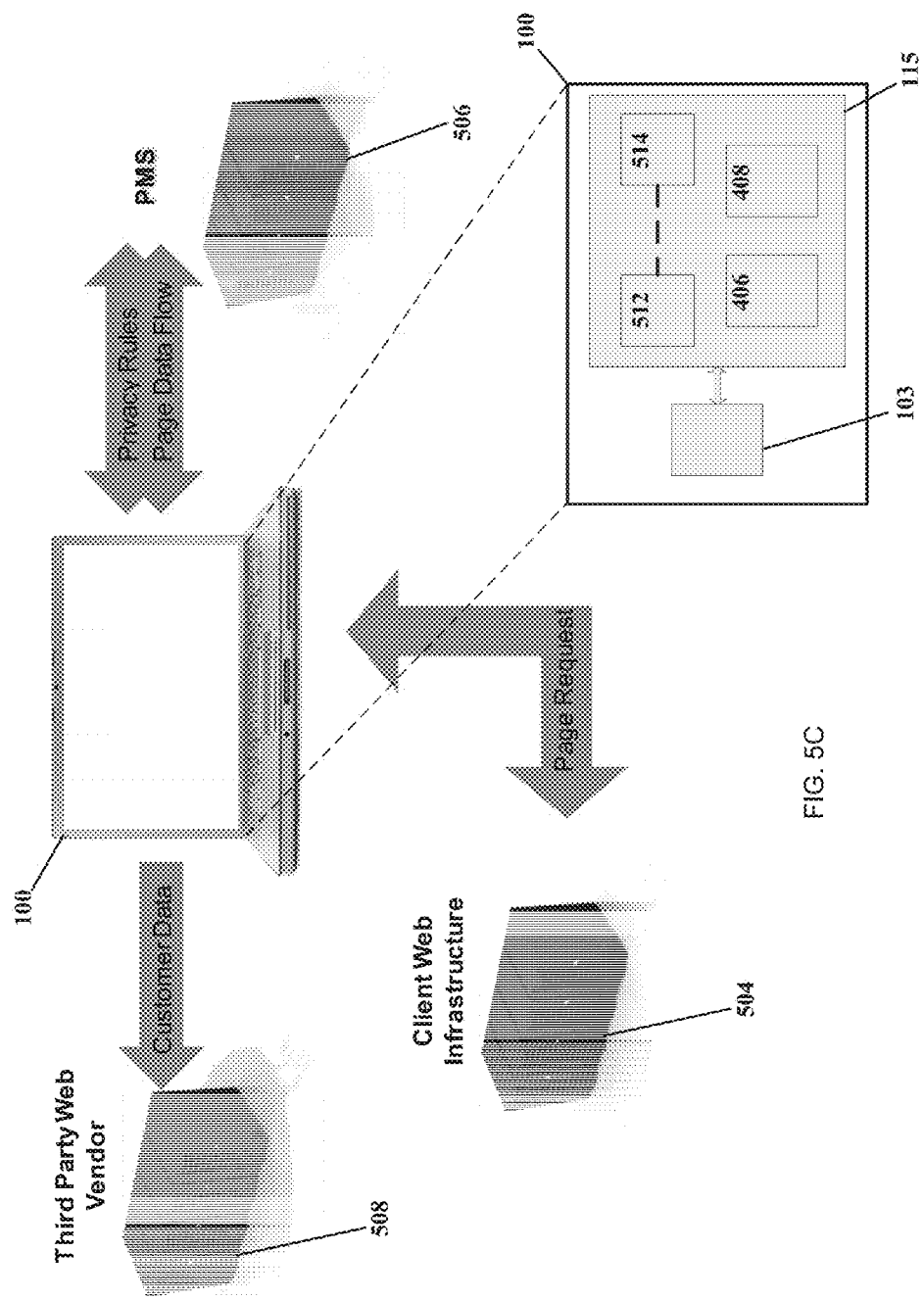

However, some companies may outsource their web analytics to one or more third party vendors 508A, 508B that specialize in web analytic, web advertising, and other web-related services. Meanwhile, these third party vendors may contract/work with one or more fourth party vendors 508C to assist in collecting data, displaying/selecting advertising images, analyzing collected data, etc. In the examples illustrated in FIGS. 5A, 5B, and 5C, a fourth party vendor (e.g., "Ad Vendor X" 580C) may be executing code 510B on the companies' webpages 502 or collecting analytics data from the webpages. This fourth party vendor may be unknown to the website owner. In such a scenario, a CPO might not have the same control over the collection and flow of information about their website visitors as in the prior scenario. Moreover, if privacy concerns (e.g., through customer complaints, from privacy laws in different jurisdictions, etc.) are raised, a CPO might not be able to efficiently assess and regulate (e.g., in realtime) the outflow of analytic data.

Basic PMS for Offline Auditing of Static Webpages

In one embodiment, the PMS may be used to audit a website. The PMS may parse a webpage (e.g., HTML) and identify all elements (e.g., image tags, Javascript tags, Flash™ tags, Applet™ tags, etc.) on the webpage. The PMS may identify the location (e.g., URL, domain, subdomain) corresponding to these elements. For example, the PMS, in such an example, may identify the domain from which all images elements (e.g., the "src" attribute of HTML image tag) are being sourced. A basic CPO dashboard (i.e., a graphical user interface that may be displayed on a computer screen) may identify the various domain names and identify what type of information is being passed to those domains. In another example, the PMS used to audit the website may also check and analyze the PMS methods for suspected attempts at modification and report them (e.g., through the CPO dashboard). In some embodiments, the checking and analysis may also use a covertly deployed JavaScript monitoring program including aspects of features described in this disclosure. In yet other embodiments, the PMS may perform direct (or hash) comparisons of selected PMS methods' code to check for modifications. The checks and/or analysis may occur at various different times, including during periodic spot checks and report the findings accordingly.

While this approach is sufficient for a basic static webpage where HTML elements are built into the page, it may be inadequate when scripting code (e.g., Javascript code) is dynamically updating the attribute values of HTML elements on the webpage and/or adding new elements to the document object model (DOM) of the webpage. In addition, the PMS in this example performs its audit offline (e.g., using web spiders/robots), and as such, is incapable of providing realtime information about and controlling the flow of data from the webpage.

PMS for Realtime Monitoring and/or Control of Dynamic Webpages

In yet another embodiment, the PMS may provide realtime information about and control of the flow of data (e.g., analytics data of a webpage) to and from a webpage 502 on a company's web servers 504. Scripting code (e.g., Javascript code) may be embedded in the webpage (e.g., at the top of the webpage) to permit the PMS to interact with the DOM and other aspects of the webpage. Such scripting code may be integrated with existing tag management or web analytic solutions. For example, this scripting code may be included as part of Ensighten's code 510A at the top of a webpage 502 as per the Ensighten Manage™ product.

Overriding Particular Methods

When a webpage is loaded, the PMS's client-browser scripting code 510 may execute on the website visitor's computing device 100 (e.g., personal computer, laptop, smartphone, tablet, etc.). Ensuring that this scripting code (e.g., Javascript) is executed before external vendors (e.g., third party, fourth party, etc.) code is executed, the PMS's client-browser scripting code 510A may override one or more Javascript methods available on the DOM of the webpage. As a result, as subsequent scripts and page elements 510 (e.g., HTML tags) are processed and rendered on the webpage, the PMS-overridden Javascript methods are executed instead of the standard Javascript methods. In particular, it may be desirable to override those methods that may result in the creation or adding of new elements to the DOM. For example, in the current Javascript standard, some examples of such methods include, but are not limited to, the (1) appendChild, (2) insertBefore, (3) replaceChild, and (4) write methods.

Javascript AppendChild( ) Example

For example, with the appendChild( )method, which adds a node after the last child node of the inputted element node, the method may be overridden with at least the following sample 4 lines of pseudo-code:

```
Line 0:   Node.prototype._appendChild = Node.prototype.appendChild;
Line 1:   Node.prototype.appendChild = function(a) {
Line 2:   //code for monitoring and regulating the appendChild method
Line 3:   this._appendChild(a); };
```

In Line 0, the "Node.prototype" language is used to refer to the base class that when modified, applies to all elements in the DOM. As such, "$_{13}$ appendChild" is used to store a reference to the original appendChild( )method that is part of the Javascript standard. Then in Line 1, the original append-Child( )method is overridden with the new, custom code in Line 2 and Line 3. Line 3 calls the original appendChild( ) function, but before that function is called, the PMS may insert code for monitoring and regulating the scripting occurring on the webpage. In particular, this code may inspect the "img" (image) element/object being passed into the appendChild( )method and examine it for information about what type of analytics data is being collected and where that data is to be sent. For example, if the "img" (image) element was an HTML image element (i.e., object), the value of the "src" attribute may indicate a domain name (e.g., URL with full path and file name) and other information. The term "domain" or "domain name" is used herein to refer, as appropriate, to the full URL of a resource or an abbreviated form of the URL.

Whitelist and Blacklist Feature

In addition, in some embodiments, the custom code in Line 2 may include a comparison of the domain name to known friendly and/or hostile domains. For example, the domain name may be compared against a whitelist 406 (i.e., friendly sites) and blacklist 408 (i.e., hostile sites). (See FIG. 6, ref. 610). The comparing may be through a direct comparison, through a comparison involving regular expressions, or a combination of the two. The comparing may involve one or more or none of a domain's host, path, file, query parameters, hash, or HTTP header field (e.g., a user agent field, a referrer field, and/or a cookie field), or other parameter. The whitelist (and blacklist) may include regular expressions with wildcards in combination with domain names, subdomain names, or the like. In addition, the blacklist (or alternatively, the whitelist) may include a default expression to indicate that all unrecognized domain names should be blocked. A CPO may, through an online dashboard or the like (see FIG. 4), maintain those domains that should be included in the whitelist 406 and/or blacklist 408. In some examples, particular sites notorious for unauthorized tracking may be automatically added (or suggested for addition) to the blacklist. For example, a database of vendors (e.g., ad servers 508C, web analytics vendors, etc.) that are known to be non-compliant with privacy regulations (e.g., local regulations, foreign regulations, and/or DNT requirements) may be used by the privacy management system to populate the blacklist accordingly.

In those cases where the element attempting to be added to the DOM of the webpage is not authorized (i.e., the domain it is communicating with is on the blacklist, or it is not on the whitelist and the default setting is to block unrecognized domains), the PMS may, in realtime, block the element from being added to the DOM. Accordingly, code may be included in Line 2 above to make the desired comparison and then react accordingly. For example, if the element is to be blocked, the value of the "src" attribute of the "img" (image) element/object may be cleared before the "_appendChild" method call in Line 3. (See FIG. 6, ref 616). Alternatively, the "_appendChild" method in Line 3 may be skipped completely. In yet another alternative, the element may be added, but modified (e.g., using a default value) so as to render void its data collection capabilities (e.g., by clearing the values of any collected analytics data to be saved in the element/object.) For example, clearing the values of collected data may include modifying/clearing/removing name-value pairs appended to a URL. (See FIG. 6, ref. 618). One of skill in the art after review of the entirety disclosed herein will appreciate that at least one benefit of one or more of the aforementioned examples is that a PMS may perform realtime monitoring and blocking/allowing of information (e.g., web analytics) transmission to particular domains/URLs. Such realtime monitoring may allow for instantaneous control/regulation of web analytics distribution without relying on after-the-fact audit of offline webpages.

Additional Reporting Features of the PMS

In addition to providing a CPO online dashboard 400, other reporting techniques may also be used in conjunction with the PMS. For example, a SMS message (or other message type, e.g., SMTP e-mail message, voice message, instant messenger chat message, etc.) may be generated and sent to a CPO (or other person or computing system) in response to a domain on the blacklist attempting to collect and/or transmit analytics data on a company's website. In another embodiment, specific types of data may be flagged such that when client-side external scripts attempt to call particular methods associated with sensitive private user data, then a realtime (or delayed) alert may be generated. For example, if an external party's script attempts to call a method to read the unique device identifier (UDID) of a smartphone device (or other unique identifier of the browser or user), a message may be automatically generated and sent to the CPO. In addition, a report 402 may be generated and sent (e.g., by e-mail) to a CPO on a regular (e.g., weekly, monthly, daily, etc.) basis identifying the domain names that attempted to collect analytics data from the company's website and the types of analytic data.

Wrapper Techniques for Methods Prohibited from being Overridden

Although the present Javascript standards permit some methods, such as "appendChild," to be overridden, the language prohibits other methods from being overridden. For example, the "src" attribute of the image element is set using a "setter" function that Javascript currently does not allow the PMS's client-browser scripting code to override. An authorized third party vendor 508A may include Javascript on the company's webpage that changes the "src" value to an unauthorized fourth party's domain 508C, and a PMS that relied solely on overriding methods and offline auditing may fail to catch the privacy policy breach.

In addition, in some instances, an analytics data transmission may be masked as an image element that is not appended to the webpage's DOM. Instead, the image element may be for a one pixel by one pixel transparent image by the analytics provider for the purposes of collecting data related to the webpage visitor. For example, the "src" attribute may be set to a URL with an appended string of parameter name-value pairs (e.g., www.hostname.com/theImage.gif?data=something&data2=someMoreData). Once the "src" attribute is set, the browser may attempt to locate and retrieve the image at the URL location. In doing so, the analytics data may be obtained at the remote server as these name-value pairs. Consequently, overriding the method used to add that image element to the webpage or inspecting the DOM may be inadequate for a PMS to monitor and control (e.g., allow or block) the outflow of analytics data. Although the image element has been described herein as an example of one technique for collecting and transmitting information from a computing device to a remote server, the disclosure contemplates that other elements/objects may be used, and the techniques and/or systems described herein may be similarly applied to those others.

Therefore, in addition to overriding those desired methods that are capable of being overridden, in some embodiments, the PMS may include a non-transitory computer-readable medium storing scripting code (e.g., client-browser scripting code) to wrap the methods available for the HTML image element/object. One of ordinary skill in the art will appreciate after review of the entirety disclosed herein that other methods/objects (e.g., elements) may be "wrapped" (i.e., referred to as overridden in various examples in this disclosure) in this manner to overcome the prohibition (i.e., due to lack of functionality in the scripting language) on overriding some methods.

For example, a HTML image element is created in Javascript 510B using an image constructor. That constructor may be overridden. However, in addition to overriding the constructor method, the PMS client-browser scripting code 510A includes a timer (or equivalent mechanism) that triggers at regular intervals (e.g., 50 ms, etc.) to inspect the values of the attributes of the image element. (See FIG. 6, ref. 606). In particular, the value of the "src" attribute may be monitored to determine if Javascript code (or other code) 510B has modified the attribute value. (See FIG. 6, ref 608). In an alternate embodiment, assuming the underlying platform 100 running the scripting code provides the functionality, the trigger may not be based on a repeating interval (or polling) model, but instead on a "push" model that automatically triggers upon detection of a change in an attribute value. (See FIG. 6, ref. 606). Such a model may be similar to how a hardware interrupt requests (IRQs) model operates, or to how event-based programming with a talker-listener model (e.g., push-interaction pattern) operates.

In the aforementioned example, the determination whether an attribute value has been modified may be made by the PMS client-browser scripting code comparing the retrieved value of the attribute to a stored value of the attribute. (See FIG. 6, ref. 608). The stored value may have been obtained when the original image constructor was called. When it has been determined that the value of an attribute has changed, the PMS client-browser scripting code may inspect the updated value and other related information to decide whether to allow the updated value. (See FIG. 6, ref 612). In one example, the PMS scripting code may keep the attribute value the same. In other examples, the PMS may compare the new value to a whitelist 406 and/or blacklist 408 to determine whether to allow the updated value. (See FIG. 6, ref 612). In yet another example, the "src" attribute value may be changed to a default value (e.g., a URL corresponding to a neutral, transparent image) instead of the new value. (See FIG. 6, ref. 616). Effectively, the PMS may conditionally keep the original image reference synchronized with the new image object created with the "wrapper" technique that overrides the image constructor. (See FIG. 6, refs. 614 & 618).

In one example in accordance with the disclosure, Javascript code may implement aspects of the example provided with at least the following sample lines of pseudo-code directed at the image element. One of skill in the art after review of the entirety disclosed herein will appreciate that the disclosure is not limited to just the HTML image element, and may be applied to other elements in the document object model (DOM) as well as other objects outside of the DOM:

```
Line 0:  (function(scope) {
Line 1:     var ImageRef = scope.Image; scope.Image = function(a,b) {
Line 2:        var THIS = this, image, eventHandlers = ['Abort','Error', 'KeyDown',
               'KeyPress', 'KeyUp', 'load'], exclude = { children:'', childNodes:'',
               outerHTML:''}, excludeMethods = {naturalHeight:'', naturalWidth:''};
Line 3:     image = new ImageRef(a,b);
Line 4:     //code here to make the object that the PMS's overridden constructor returns
            (i.e.., "THIS") look exactly like the image object that the original
            implementation returns
Line 5:     //code here to create empty functions on the PMS's image object for all the
            event handlers (e.g., onLoad, etc.) listed in "eventHandlers" in Line 3 so that
            these event handler methods can be monitored and controlled
Line 6:     setInterval( function( ) {
Line 7:        for ( p in THIS ) { if ( (THIS[p] !== image[p]) && (THIS[p] !==
               undefined) && !(p in excludeMethods)) { try { if ( p === 'src' ) {
Line 8:           //code for monitoring and regulating the image element's src attribute
Line 9:     } image[p] = THIS[p]; THIS[p] = image[p]; ...
```

Referring to Line 0 in this example, a new function has been created that passes Javascript's global scope (i.e., "window") into the function. In Line 1, the original image constructor function is stored into the variable "ImageRef," then the constructor function for the image element is overridden. (See FIG. 6, ref 602). The "a" and "b" input parameters may optionally provide the width and height, respectively, of the image. In Line 2, the private "THIS" variable indicates which eventHandlers should be monitored and which methods on the image element/object may be excluded.

Referring to Line 3 of the sample code in this example, although the ImageRef( ) method is called with two input parameters, conditional code (e.g., if-else statements) may be included to optionally call the ImageRef( ) method with either one input parameter or no input parameters. Such conditional code may be useful to, among other things, when less than the two optional input parameters are desired. In Line 4, a "for" loop may be used to copy all of the properties of the original image element/object to the object created by the wrapper. (See FIG. 6, ref. 604). In Line 5, the eventhandlers are setup in the wrapper for monitoring. In Line 6, a function is defined that will be repeatedly executed at a regular interval. (See FIG. 6, ref. 606). In this case, the pseudo-code omits the end bracket ("}") for the setInterval ( ) and that the call accepts the quantity of time (e.g., 50 ms) for each interval.

In Line 7, the code inspects those attributes of the image that are of interest to the PMS. (See FIG. 6, ref 608). In particular, in line 8, if the attribute being analyzed is the "src" attribute of the image object, then the PMS may react according to privacy rules. For example, as explained above with respect to Line 2 of the appendChild( ) pseudo-code example, the value of the "src" attribute may be checked (e.g., compared) against a whitelist and/or blacklist, as well as other possible actions/rules. (See FIG. 6, ref. 608). If the PMS determines that no privacy violation would occur, then the actual synchronization of the predefined object (e.g., image object 514) and the corresponding overridden object (e.g., wrapper image object 512) occurs in Line 9. (See FIG. 6, refs. 612 & 614).

One of ordinary skill in the art after review of the entirety disclosed herein will appreciate that the lines of pseudo-code presented above are merely a paraphrasing of the code and/or functionality achieved by the code. One or more lines of code may have been omitted in presenting the simplified example above.

Identifying the Third Party Culprit Behind the Fourth Party Access

Referring to the example above with respect to monitoring the image element, Line 2 may also include a call to a logStack( ) function (or comparable function) to determine what specific Javascript code attempted to create an image element/object or update the "src" attribute of an image element. Such information may allow a CPO to identify which third party script is responsible for the data being sent, in addition to identifying what the data being sent out is. In some embodiments, the logStack( ) function operates by creating an "Error" type object and stripping data from it. The "Error" object may contain a stack trace that includes information about where the call to create or modify an image element/object originated from. While this function may be used in some embodiments in accordance with the disclosure, it may be omitted in some embodiments where browser-specific limitations may prevent proper access to the "Error" object. The PMS may, in some examples, identify the vendor responsible for the privacy policy violation on the CPO dashboard, in addition to displaying other information. This disclosure also contemplates a stack trace (or comparable log) being captured in other ways. For example, the "arguments.caller" properties or "Function.caller" properties within a logStack method (or comparable function) may be examined in lieu of, or in addition to, examining an Error object as described above.

Private Information Detection and Handling

As disclosed above, aspects of this disclosure relate to preventing or reducing the likelihood that analytics data (e.g., web analytics data) is captured by undesired and/or unknown third and/or fourth parties. To this end, techniques for overriding methods used by third and fourth parties to capture analytics data are taught. This disclosure further teaches techniques for creating wrapper objects to monitor and/or block transmission of analytics data to third and/or fourth parties when such parties use "setter" functions that cannot be overridden. Each of the techniques described may use a whitelist and/or blacklist to determine whether the third or fourth party attempting to capture the analytics data should be blocked from doing so. In another aspect of this disclosure, rather than block analytic data from being transmitted to a third or fourth party based on whitelists and/or blacklists alone, the PMS may evaluate the analytics data that a third and/or fourth party is attempting to capture to determine whether that analytics data includes private information. In other words, in some embodiments, the PMS may also analyze (or process) the analytics data to determine its contents, and determine whether those contents might include private information. Herein, private information may include personal information, which may be any information that identifies a person. Examples of personal information may include a name (first, middle, last, nickname), username, phone number, zip code, address, age, race, etc. Private information may also include any other information that a person desires to be kept private, such as account information (e.g., bank account information, credit card account information, etc.), passwords, security questions and answers, etc.

The PMS may implement the detection of private information in a variety of manners. Each implementation may include a method for extracting data from a node in a document (or object model, such as a DOM). Further, such methods may be classified into one of two categories—methods for extracting data by observing properties and methods for extracting data by calling methods—based on the way in which data (which may potentially include private information) is extracted. Some embodiments may implement methods from both categories. A description of methods from the two categories follows.

Methods for Extracting Data by Observing Properties

One or more nodes of an object model, such as a DOM, may be accessed by code of the PMS. The PMS code (e.g., the PMS's client-browser scripting code 510A) may include Ensighten's single consistent line of JavaScript code (described in U.S. Provisional Application Ser. No. 61/428,560) executed by a program (e.g., a browser) running on a workstation 201. In such cases, the single line of code may provide the workstation 201 with scripting code of the PMS, so that code of the PMS on Ensighten's database 506 (or another server such as the webpage owner's server 504) may interact with and evaluate the nodes of the DOM of the webpage 502 loaded on the workstation. In other cases, the code of the PMS may be stored entirely on the workstation 201 itself (e.g., in RAM 105 or ROM 107) and executed by a processor (e.g., processor 103) of that workstation 201.

Regardless of where the PMS code is stored, once it has access to the DOM, the PMS code may call a function to retrieve any of the nodes within the DOM. For example, the PMS code may use the getElementById(id) function to retrieve a particular node. The getElementById(id) function is a predefined function of JavaScript for retrieving elements from the DOM. Each element in the DOM has an associated identifier. By specifying a desired identifier as the id parameter in the getElementById(id) function, the PMS code may retrieve the associated element from the DOM. The PMS code may create a variable and assign the result of this function to the variable. For example, the PMS code may contain the following line of code to access a text node including a person's last name (e.g., "Doe" as in "John Doe") and assign it to a variable named "node":

var node=document.getElementById("Last_Name_Text_Node");

In this line of code, the "document" refers to the DOM, having the nodes of a particular webpage 502, that the PMS code may access. Next, properties of the variable "node" may be observed to extract data (e.g., a value) using predefined functions of JavaScript. For example, the ".nodeValue" property may be used to extract the value included within the "Last_Name_Text_Node." The extracted value (which may be, e.g., text in the case of the Last_Name_Text_ Node) may be assigned to another variable named, e.g., "data" within the PMS code as follows:

var data=node.nodeValue;

As a result of this line of PMS code, where "Doe" (as in "John Doe") is included within the "Last_Name_Text_Node," the variable "data" may be assigned "Doe." Subsequently, as described in more detail below, the PMS code may then analyze the variable "data" to determine whether "Doe" includes private information.

Although the getElementById(id) function is described above, another function (e.g., the getElementsByTagName(id) function in JavaScript) could be used in some embodiments. Likewise, the PMS code may use other predefined properties to extract data (e.g., values) from the nodes of the DOM. For example, the PMS code may use the ".innerHTML", ".outerHTML", ".textContent", ".innerText", etc. properties to extract various data from the different nodes of the DOM. In some examples, multiple properties of the same node may be observed even though only one of the properties may be assigned to a variable. For example, the variable "data" may be assigned using an "OR" operator (e.g., "||") as follows:

var data=node.innerText||node.textContent;

This type of assignment may be useful for checking properties of the node regardless of the browser (e.g., Internet Explorer™, Firefox™, Safari™, etc.) being used. Herein, the PMS may be configured to block analytics data for a variety of browsers. Thus, in some cases the PMS may use an "OR" operator as above, while in other cases the PMS may detect the type of browser being used and operate certain modules of code based on the detection result.

Further, one or more arrays may be created with each property that the PMS desires to evaluate as follows:

var properties=['innerText', 'outerText', 'innerHTML', 'outerHTML'];

Then, the PMS may traverse the array and execute certain functions to evaluate each property in the array. Still, in other embodiments, multiple variables may be used to extract data from different properties of the same node. For example, the PMS code may include code like:

```
var data1 = node.nodeValue;
var data2 = node.textContent;
```

Third and fourth parties may attempt to capture analytics data from any or all properties of a node. Since private information may be found in a variety of properties of the same node, it may be desirable to evaluate each property. In some cases, private information may be divided and stored among a plurality of properties, so it may be desirable that the PMS code observe multiple properties of the same node and evaluate the data together to detect private information as described below. As the PMS evaluates more properties, the PMS may achieve higher levels of security. However, evaluating more properties may decrease performance, and therefore, the PMS may be customized to evaluate only certain properties deemed to be more likely to include private information and/or more likely to be inspected by third and fourth parties.

Methods for Extracting Data By Calling Methods

Methods in this second category, use methods on nodes to extract data held in the nodes. Preliminarily, the PMS code incorporating processes from this second category may obtain nodes in the same way as described above using, e.g., "getElementById(id)" and may assign the obtained nodes to variables. However, processes in this category, call methods for a particular node, rather than use properties of the particular node, to extract values from that node. For example, continuing the example above, instead of using the ".nodeValue" property, a "substringData( . . . )" method may be used on the variable "node" to which the "Last_Name_Text_Node" has been assigned. Specifically, the following lines of PMS code, implementing a method for extracting data by calling a method, may be used.

```
var node = document.getElementById("Last_Name_Text_Node");
var data = node.substringData(1, 10);
```

As a result of this PMS code, where "Doe" (as in "John Doe") is included within the "Last_Name_Text_Node," the substringData(1, 10) method may return "Doe" so that it may be assigned to the variable "data."

Although the getElementById(id) function is described above again, another function (e.g., the getElementsByTagName(id) function in JavaScript) could be used in some embodiments implementing methods for extracting data by calling methods as well. Also, the PMS code may leverage other predefined methods in JavaScript to extract values from the nodes of the DOM. For example, the PMS code may use the "getAttribute( . . . )" method on a node to extract a value from that node.

Method for Detecting and Handling/Blocking Private Information

FIGS. 7A and 7B include flowcharts illustrating a method of the PMS for detecting and handling private information. The steps of FIGS. 7A and 7B may be performed by one or more processors as a result of executing machine-executable instructions on a page (e.g., a webpage) and from the PMS. As explained above, access to scripting code of the PMS may be through Ensighten's gateway, including a single line of code in the webpage 502. In step 700, an object model (e.g., a DOM) of a webpage 502 may be accessed. In particular, a browser may parse the webpage to obtain the DOM including each node on the webpage 502. At step 702, a particular node within the object model may be obtained. The DOM may be traversed in a variety of ways such that the order in which nodes are obtained at step 702 may vary. In some embodiments, the method may start by obtaining a node at the top of the node tree of the DOM. For example, the node obtained in the first instance of step 702 of this method may be a child node of the root element of the node tree of the DOM. Further, in some embodiments, step 702 may obtain a node belonging to one node-type over another node-type. For example, the node first obtained in step 702 may correspond to an element node rather than a text node where it is desirable to evaluate element nodes first. In recognition that third and fourth parties may commonly capture analytics data from certain nodes, step 702 may be configured to obtain such nodes before obtaining others. Still, in other cases, the node first obtained in step 702 may be randomly chosen.

After a node is obtained in step 702, the method may proceed to step 704. At step 704, a wrapper object overriding the obtained node may be defined. Overriding (or wrapping) the obtained node may include overriding the constructor method of the obtained node. Notably, the obtained node may be any of a variety of different types of nodes. For example, the obtained node may be a text node, element node, attribute node, etc. As such, the PMS code may be configured to override the constructor of any type of node. Specifically, the PMS may include a function that is configured to create a generic wrapper object for any type of node that is obtained at step 704. For example, the following "GenericWrapper" function may be used.

```
function GenericWrapper(elementType, excludeProperties) {
    var wrapper = this,
        excludeProperties = excludeProperties || {
            '_id': true,
            'fileUpdatedDate': true,
            '_errors': true
        },
        reference = Function.prototype.call.call(createElement, document, elementType),
        request = new Request( ),
        timeStamp = +new Date( );
    request.source = 'wrapper';
    request.type = elementType;
    request.id = timeStamp;
    Bootstrapper.gateway.history.before[timeStamp] = {
        request: request,
        nodeRef: reference
    };
    wrapper._id = timeStamp;
    wrapper._reference = reference;
    wrapper._errors = [ ];
    // Determine if the wrapper has CSS selector properties
    var hasId = wrapper.id,
        hasClass = wrapper.className,
        hasStyle = wrapper.style;
    // If it does not have CSS selector properties, hide the wrapper
    if (!hasId && !hasClass && !hasStyle) {
        wrapper.style.cssText = 'display: none';
    }
    cloneProperties(wrapper, reference);
    createEventHandlers(wrapper, reference);
    createSetAttribute(wrapper);
    createForwardMethods(wrapper, reference);
    createGetters(wrapper, reference);
    createListenerLoop(wrapper, reference, excludeProperties);
}
```

This function allows a generic wrapper object to be created instead of the obtained node. As described above, some languages, such as JavaScript, do not allow certain methods, e.g., the setter function used to set the 'src' attribute of an image element, to be overridden. By creating a generic wrapper object instead of the node obtained in step 702, the PMS is able to circumvent this limitation. Specifically, the generic wrapper object that replaces the obtained node may be configured with special helper functions (e.g., setter functions, getter functions, eventHandler functions, etc.) that allow the PMS to control values of properties of the wrapper object and values returned by methods of the wrapper object. In other words, since the PMS cannot change certain values of a node, it uses its own unique function (e.g., "GenericWrapper") that can create a generic wrapper object for any type of node to replace that node.

In order for the PMS code to call the "GenericWrapper" function to create a generic wrapper object for any type of node, the "GenericWrapper" function may use specially designed helper functions. Example helper functions include the following:

```
function proxyEventHandler(timeStamp, status, proxy) {
    return function (event) {
        proxy.width = this.width;
        proxy.height = this.height;
        Bootstrapper.gateway.resourceComplete(this, timeStamp, status);
        proxy.pause = false;
    };
}
```

```
function proxyMethod(property, obj) {
    return function proxyMethodFn( ) {
        if (typeof obj[property] !== 'function') {
            return false;
        }
        return obj[property].apply(obj, arguments);
    };
}
var cloneDefaults = {
    'skip': { }
};
```

```
function cloneProperties(proxy, reference, options) {
    // Fallback clone options
    options = options || cloneDefaults;
    var skip = options.skip || cloneDefaults.skip;
    for (var property in reference) {
        // If the property should not be skipped
        if (!skip[property]) {
            try {
                // If the original property is a method, proxy it through our reference
                if (typeof reference[property] === 'function') {
                    reference[property] = proxyMethod(property, proxy);
                } else {
                    // Otherwise, copy the value directly to our proxy
                    proxy[property] = reference[property];
                }
            } catch (error) {
                proxy._errors.push(error);
            }
        }
    }
}
```

```
function createEventHandlers(proxy, reference) {
    each(eventHandlers, function (event) {
        proxy['on' + event] = noop;
        reference['on' + event] = proxyMethod('on' + event, proxy);
    });
}
```

```
function createSetAttribute(proxy) {
    proxy.setAttribute = function (property, value) {
        proxy[property] = value;
    };
}
```

```
function createGetAttribute(proxy, reference) {
    proxy.getAttribute = function (property) {
        return proxy[property] || reference[property];
    };
}
```

```
function createForwardMethods(proxy, reference) {
    each(forwardMethods, function (method) {
        if (proxy[method]) {
            return false;
        } else {
            proxy[method] = proxyMethod(method, reference);
        }
    });
}
```

```
function createGetters(proxy, reference) {
    // Iterate over the getters (e.g. getElementsByClassName, getAttribute)
    each(getters, function (getter) {
        // If the original method exists and the proxy method does not exist
        var origFnExists = reference['get' + getter],
        proxyFnExists = proxy['get' + getter];
        if (origFnExists && !proxyFnExists) {
            // Copy the method from our reference to our proxy
            proxy['get' + getter] = proxyMethod('get' + getter, reference);
        }
    });
}
```

```
function handleSrcChange(proxy, reference) {
    var request = Bootstrapper.gateway.history.before[proxy._id].request;
    if (request === undefined) {
        request = new Request( );
        request.id = proxy._id;
        request.source = 'proxy';
        request.type = reference.tagName.toLowerCase( );
    }
    request.destination = proxy.src;
    if (Bootstrapper.gateway.onBefore(request, reference)) {
        attachEvents(reference, proxyEventHandler, proxy._id, proxy);
        proxy.pause = true;
        reference.src = proxy.src;
    } else {
        proxy.src = reference.src;
        Bootstrapper.gateway.onBlock(request, reference);
    }
}
```

```
function createListenerLoop(proxy, reference, excludeProperties) {
    setInterval(function ( ) {
        if (proxy.pause || proxy.ignore) {
            return false;
        }
        for (var property in reference) {
            try {
                if (typeof reference[property] === 'function' || property in
                        excludeProperties || reference[property] === undefined ||
                        proxy[property] === reference[property]) {
                    continue;
                }
```

-continued

```
                if (property === 'src') {
                    handleSrcChange(proxy, reference);
                } else {
                    if (typeof proxy[property] !== 'function' &&
                        proxy.pause) {
                        continue;
                    }
                    reference[property] = proxy[property];
                    proxy[property] = reference[property];
                    if (reference[property] !== proxy[property]) {
                        excludeProperties[property] = true;
                    }
                }
            } catch (error) {
                proxy._errors.push(error);
                excludeProperties[property] = true;
            }
        }
    }, 100);
}
```

After defining a wrapper object, step 706 may configure the wrapper object to match the obtained node. That is, the wrapper object may be configured so that it has all the same properties and values (e.g., text) as the original node obtained from the DOM. The same function that is used to define the generic wrapper object in step 704 (e.g., "GenericWrapper") may include one or more helper functions for configuring the generic wrapper object to match the obtained node. When the function for defining the generic wrapper object (e.g., "GenericWrapper") is called, the call to that function may include a parameter for passing the obtained node. Thus, the function for defining the generic wrapper object may receive a copy of the node that it attempts to replicate. The function for defining the generic wrapper object may therefore extract data from the copy of the node it receives using the methods discussed above for extracting data (e.g., by observing properties of the node and calling methods on the node).

In step 708, the PMS may check to see whether data of the obtained node is to be analyzed or not to check for private information. That is, step 708 may include a determination by the PMS as to whether the wrapper object to be created in place of the obtained node should be configured to analyze data. In some embodiments, the determination in step 708 may depend on the type of node that was obtained in step 702. Data of some nodes may be analyzed, while data of other nodes might not be analyzed. For example, the PMS code may be able to or authorized to analyze data for element nodes, but not text nodes. The entity that provides the PMS (e.g., Ensighten) may collaborate with its customers (e.g., webpage and website owners) to determine which nodes should be analyzed and which nodes should not. This collaboration could result in a list of names of nodes to analyze. If so, step 708 may compare the name of the obtained node with the names on such a list to determine whether the wrapper object to be created in place of the obtained node should be configured to analyze data. To balance a desired level of performance with a desired level of security, the PMS may be customized to replace certain nodes with wrapper objects that analyze data for private information.

Further, it should be understood that the determination of whether a node is to be replaced with a wrapper object that analyzes data may be made each time that node is to be created. That is, each time a user attempts to view a webpage with the PMS code, the PMS may make the determination in step 708. Further, the result of the determination may differ each time based on whether data analysis is turned on or off. The entity providing the PMS code (e.g., Ensighten) or webpage owners may customize the PMS code to turn on/off data analysis. For example, turning on/off data analysis may be performed by modifying a setting stored in association with a particular webpage or website. If so, checking to see whether data analysis is on or off may include checking such a setting.

If data is not to be analyzed (No at step 708), the PMS may proceed to step 710 to replace the obtained node with the wrapper object that has been created to look exactly like the obtained node. In other words, the obtained node may be synchronized with the wrapper object so that the wrapper object becomes part of the DOM. In some cases, step 710 might not replace the obtained node since wrapper object is configured to replicate the obtained node. In any event, after step 710, the PMS may proceed to step 799 to determine whether all nodes have been obtained. If all nodes have been obtained, the PMS code may stop obtaining nodes and may finish executing. If there are other nodes in the DOM that the PMS code has not yet obtained, then the PMS code may return to step 702 and perform subsequent steps with respect to the most recently obtained node.

If data is to be analyzed (Yes at step 708), the PMS may proceed to step 712. At step 712, the PMS may configure the wrapper object to include one or more customized getter functions. A getter function is a function called on a node to retrieve data from the node. The "createGetters" function disclosed above may be configured to build the one or more customized getter functions. By replacing the obtained node with a wrapper object having a customized getter function, the PMS code may control what data is returned by the wrapper object. Specifically, the customized getter function may be configured to return data that the obtained node would return, as long as that data does not include private information and/or is not being used for analytics data. Accordingly, the customized getter function may be configured with functions, or calls to functions, that can determine whether data of the generic wrapper object, which is to replace the obtained node, includes private information. Additionally, or alternatively, the customized getter function may be configured with functions, or calls to functions, that can evaluate a stack trace to determine if the getter function is being called to return analytics data or not.

In step 714, the PMS code may replace the obtained node with the wrapper object having the customized getter function in the DOM. In other words, the obtained node may be synchronized with the wrapper object so that the wrapper object becomes part of the DOM at step 714. As such, the obtained node and its original functions (e.g., original getter functions) may no longer be accessible to other nodes in the DOM seeking to collect analytics data. Instead, nodes seeking to collect data from the obtained node may attempt to access the new getter functions of the wrapper object, which, unlike the original obtained node, may prevent private information from being captured.

In some embodiments, several of the above described steps for traversing the DOM to obtain nodes, creating generic wrapper objects, and replacing the obtained nodes with the generic wrapper objects may be implemented with JavaScript code. The following lines of psuedo-code illustrate how JavaScript may be used to perform some of the steps described above. In view of these lines and the entirety of this disclosure, one of skill in the art will appreciate that other variations and methods may be implemented.

```
Line 0:    var elems = document.getElementsByTagName(*);
Line 1:    for (var elem in elems) {
Line 2:        var theNodeToWrap =
               document.getElementByID('elem');
Line 3:        var NewWrapperObject = new
               GenericWrapper(theNodeToWrap);
Line 4:        document.replaceChild(theNodeToWrap,
               NewWrapperObject); }
```

Lines 0-2 may be used to implement steps 700 and 702 described above. In Line 0, all element nodes in the DOM (e.g., "document") may be placed in an array of elements (e.g., "elems") using a method (e.g., getElementsByTagName( . . . )) called on the DOM. By using an asterisk (e.g., "*") in this method, all elements of the DOM may be identified.

In Line 1, a "for loop" may be created to act on each of the elements in the array of elements identified in Line 0. Thus, the code in Lines 2-4 may be performed for each element in the array of elements.

In Line 2, a particular element from the array of elements is chosen to be the obtained node in step 702 for which a wrapped object is to be created. This chosen element is assigned to a variable called "theNodeToWrap."

In Line 3, a call to the GenericWrapper function is made with "theNodeToWrap" being passed as a parameter. This line of code stores the generic wrapper object returned by the GenericWrapper function into a variable called "newWrapperObject." Further, the call in this line may be an implementation of step 704 above and may initiate the process of performing steps 706, 708, and 712.

In Line 4, the replaceChild( . . . ) method is called on the DOM to replace "theNodeToWrap" with the "newWrapperObject." This code may implement either step 710 or 714 above, depending on whether the GenericWrapper function has created a wrapper object with a function (e.g., getter function) that analyzes data.

Once an obtained node is replaced with the wrapper object at step 714, a call can be made to any of the functions of that wrapper object. For example, another node, in the same DOM that the wrapper object has been placed into, may call the getter function of the wrapper object. Some nodes may call the getter function of the new wrapper object for legitimate, non-analytics data collection reasons. For example, one node may call the getter function of the new wrapper object to display a value of the new wrapper object on a webpage 502 for the user to view. This action or event may be acceptable to the user even where the displayed value is private information, since it is the user who is viewing the private information and the private information is not be transmitted or viewed by others. However, in comparison, some third or fourth parties may insert a node on a webpage 502 that calls getter functions of other nodes on that same page to collect analytics data. Step 716 illustrates an instance where some type of node (either a node by a third of fourth party that collects analytics data or a node that does not collect analytics data) makes a call to the getter function of the new wrapper object.

At step 718, the getter function of the new wrapper object may determine whether it was called for analytics data collection purposes. As described above, the getter function of the new wrapper object may include one or more functions for evaluating a stack trace to determine a likelihood that the getter function is being called to return data that would be transmitted as analytics data. For example, evaluating the stack trace, the getter function may determine that the node that called it also called a number of other getter functions, and as a result, the getter function may conclude that it has been called by a node that is collecting analytics data. Additionally, or alternatively, the getter function may evaluate the node that called it to see if a URL of that node appears on a whitelist, including a list of pre-approved URLs, and/or a blacklist, including a list of unapproved or disapproved URLs.

In any event, if the getter function called determines that it has not been called for analytics data purposes (No at step 718), the getter function may function as the original node it replaced and return the value requested at step 720. In contrast, if the getter function determines that it may have been called for analytics data purposes (Yes at step 718), step 722 may be performed.

In step 722, the PMS may implement one or more methods for extracting data from the wrapper object by observing one or more properties of the wrapper object as described above. Specifically, the getter function (and/or one or more helper functions called by the getter function) may extract one or more properties of the same wrapper object it belongs to and observe those properties. As explained in general above, a property of a node may be extracted to obtain potential analytics data by using the following line: var data=node.nodeValue. When used in step 722, "data" may be a variable of the wrapper object, and the "node" may be the wrapper object itself which has been configured to match the obtained node.

Additionally, or alternatively, the PMS may perform step 724. At step 724, the PMS may implement one or more methods for extracting data from the wrapper object by calling one or more methods on the wrapper object as described above. As explained in general above, a method, such as "substringData( . . . )," may be called on a node to extract data from the node as follows: var data=node.substringData(1, 10). When used in step 724, "data" may be a variable of the wrapper object, and the "node" may be the wrapper object itself which has been configured to match the obtained node.

Once the data is extracted, the PMS may execute pattern recognition software to evaluate the data at step 726. The pattern recognition software may comprise one or more functions called by the getter function to evaluate the extracted data. Alternatively, the pattern recognition software may be stored on the Ensighten database 506, the webpage owner's database 504, or another server 508. Further, the pattern recognition software may be configured to look for patterns within the extracted data to identify private information. Certain types of private information have common characteristics (or patterns) that may indicate what type of information is included. For example, since it is known that telephone numbers are often represented as seven (7) digits, if the extracted data has seven digits, then it may be an indication that the data includes a phone number. The pattern recognition software may make the final determination as to whether extracted data is or is not private information, such as a phone number. In different embodiments, different degrees of similarity may be required. For example, extending the phone number example above, the pattern recognition software might not classify seven digits as a phone number, but may classify the seven digits as a phone number if the first three digits are separated by a character (e.g., period or hyphen) from the last four digits, as this is a common way of representing phone numbers. Although phone numbers are used by way of example here, other types of private information may have common characteristics, and therefore, may be recognizable using pattern recognition software. Further, recognizing one piece of private information may assist in recognizing another piece of private information. For example, if the software determines that the data includes a credit card number, then it may determine that three other digits in proximity to that credit card number correspond to a security code for that credit card.

The pattern recognition software may also use information regarding the context of the extracted data. For example, the PMS may determine that the obtained node is from a DOM that corresponds to a webpage on a bank's website. The PMS may feed this information into the pattern recognition software so that the pattern recognition software may be particularly sensitive to identifying a bank account number within the extracted data. In addition, the pattern recognition software may deploy a variety of decryption algorithms for decrypting the data before detecting whether it contains private information, as some wrapper objects may store data in an encrypted form. Context information may also be used by the pattern recognition software to determine which decryption algorithms to use or to start with. For example, a webpage/website owner may require the PMS to encrypt certain data when creating the wrapper object, and thus, the PMS may use its knowledge that the wrapper object belongs to such a webpage/website to choose a decryption algorithm to decrypt the data before evaluating it.

Step 728 checks the results of the pattern recognition software. Specifically, the PMS at step 728 may determine whether the pattern recognition software has identified the extracted data as private information. Notably, in some examples, the determination at step 728 might not check whether the private information is correct—just that it is private information (e.g., a phone number). For example, step 728 might not determine whether the phone number in the extracted data is the correct phone number of the person viewing the webpage 502 from which the node is obtained, and instead, may determine whether the extracted data is a phone number at all (e.g., has the format of a phone number). In addition, in some examples, step 728 may determine whether the identified private information should be blocked from being transmitted to third and fourth parties. In some cases, the pattern recognition software may identify private information that a user (e.g., a CPO) might not mind allowing a third or fourth party to collect in analytics data. In such cases, even though the pattern recognition software detects that analytics data includes private information, the PMS may determine that the data is not private information that should be blocked based on rules set by a user (e.g., a CPO). If the rules for the webpage including the obtained node indicate that the private information does not have to be blocked, the PMS may determine that the data is not private information at step 728 (No at step 728). A user (e.g., a CPO) may assist in creating these rules by indicating whether or not he/she wants to keep the private information protected from third and fourth parties through, e.g., a dashboard 404 described in more detail below. If the PMS determines that the extracted data is not private information (No at step 728), the PMS may proceed to step 730. Step 730 may be similar to step 720 described above.

In some embodiments, the determination at step 728 may consider whether the extracted data is the actual (or correct) private information of the person viewing the webpage from which the node is obtained. The PMS may use one or more internal databases, which may store information provided by users to the PMS for the purpose of protecting their private information, or one or more external databases (e.g., the yellowpages) to check whether private information is correct. In these cases, if the private information is not correct, the PMS may proceed to step 730 because there might not be a concern to protect the information when it is wrong.

If the data is private information (Yes at step 728), the PMS may proceed to step 732. The present disclosure may provide several solutions for dealing with situations in which analytics data includes private information. At step 732, the PMS may determine which of the one or more solutions to implement. Different solutions may be used for different embodiments and/or nodes. As illustrated in FIG. 7B, the PMS may determine whether to report the analytics data or modify the analytics data.

At step 734, the PMS may report the analytics data identified as private information to a database, such as Ensighten's database 506. Accordingly, the analytics data that third and fourth parties are trying to capture can be subsequently reviewed. Further, trend analysis may be performed on the data reported to detect what types of information are most commonly targeted by third and fourth parties. Along with reporting the analytics data, the PMS may also report the type of node used to caption that analytics data (e.g., the type of node that called the getter function at step 716) and/or a URL that the data was intended for or transmitted to if not blocked. From this information, the trend analysis may also determine which third and fourth parties are getting what analytics data and/or how (e.g., through what type of nodes) the third and fourth parties are capturing the analytics data.

Moreover, in some embodiments, the PMS may use results of the trend analysis to enhance security of private information. For example, if the PMS determines that a particular URL is receiving an amount of analytics data above a certain threshold, the PMS may automatically add that URL to a blacklist to block that URL from receiving analytics data. In any event, after step 734, the PMS may proceed to step 799 to check whether additional nodes are to be obtained from the DOM.

Returning to step 732, if the analytics data is to be modified (Modify at step 732), then the PMS may proceed to step 736. At step 736, the analytics data may be modified in a variety of ways. In some examples, the PMS may clear or erase the data so that if received it has a value of null, "0", undefined, false, etc. Alternatively, the PMS may change the analytics data to have some other value. For example, the PMS may change a bank account number to some other number to fool the third or fourth party into believing they are receiving the correct bank account number. This may be helpful in tracking whether third or fourth parties are inappropriately using the analytics data they are receiving. For example, if a fourth party receiving a changed bank account number attempts to access a bank account with that changed bank account number, the fourth party may be tracked down. In other examples, the analytics data may be changed to include a warning to the third or fourth party that they are not authorized to receive the analytics information that they are attempting to capture.

Once analytics data is modified, in step 738, the modified analytics data may be returned to the node that called the getter function at step 716. As a result, the modified analytics data may be transmitted to the third and fourth parties associated with the node that called getter function at step 716, and the private information originally in the obtained node may be protected.

To implement steps 728-738, the PMS code may include if-else statements. That is, if-else statements within the PMS code may be used to handle the results of the pattern recognition software. For example, the PMS may include an if-statement that checks a boolean returned by the pattern recognition software, and if the value of that boolean indicates that the information is private information, the PMS code may execute code to clear the data (e.g., data=0) or modify it (e.g., data="information not allowed").

Also, after step 738, the PMS may proceed to step 799. If the PMS determines that all nodes in the DOM of a particular webpage 502 have been obtained and processed at step 799, then the PMS may stop obtaining nodes and finish processing until the page is refreshed or a new page is selected.

FIGS. 7A and 7B illustrate example steps. In some embodiments, certain steps may be optional, omitted, or reordered. For example, in some cases, step 718 may be omitted and the getter function of the new wrapper object may treat all calls to it as potentially coming from a node collecting data for analytics purposes. Moreover, although FIG. 7B shows that returned private information may be reported or modified, these solutions do not have to be employed in the alternative. In some embodiments, private information might only be modified, private information might only be reported, or private information may always be modified and reported.

In another alternative embodiment, an additional step may be performed between steps 702 and 704 to determine whether the obtained node includes private information. If the obtained node does not include private information, then the PMS might not go through the process of creating a wrapper object for the obtained node. In other words, the PMS may determine that information of the obtained node does not need to be protected, and therefore, may skip creating a generic wrapper object for that obtained node.

In yet another alternative embodiment, an additional step may be performed between steps 702 and 704 to determine whether a URL of the obtained node is on a blacklist. If the obtained node includes a URL found on a blacklist, the PMS might not create a wrapper object for that obtained node, and instead, may simply remove it from the DOM. In other words, a step could be added to scrub the DOM to remove nodes known/suspected to be used for undesirable analytics data collection.

In light of the additional steps just described, it should be understood that other steps may be added to the steps of FIGS. 7A and 7B, and that the steps shown in those figures are intended to provide examples steps from which a person skilled in the art would understand how to make and use the PMS code.

Chief Privacy Officer's Dashboard

Figure 4A:
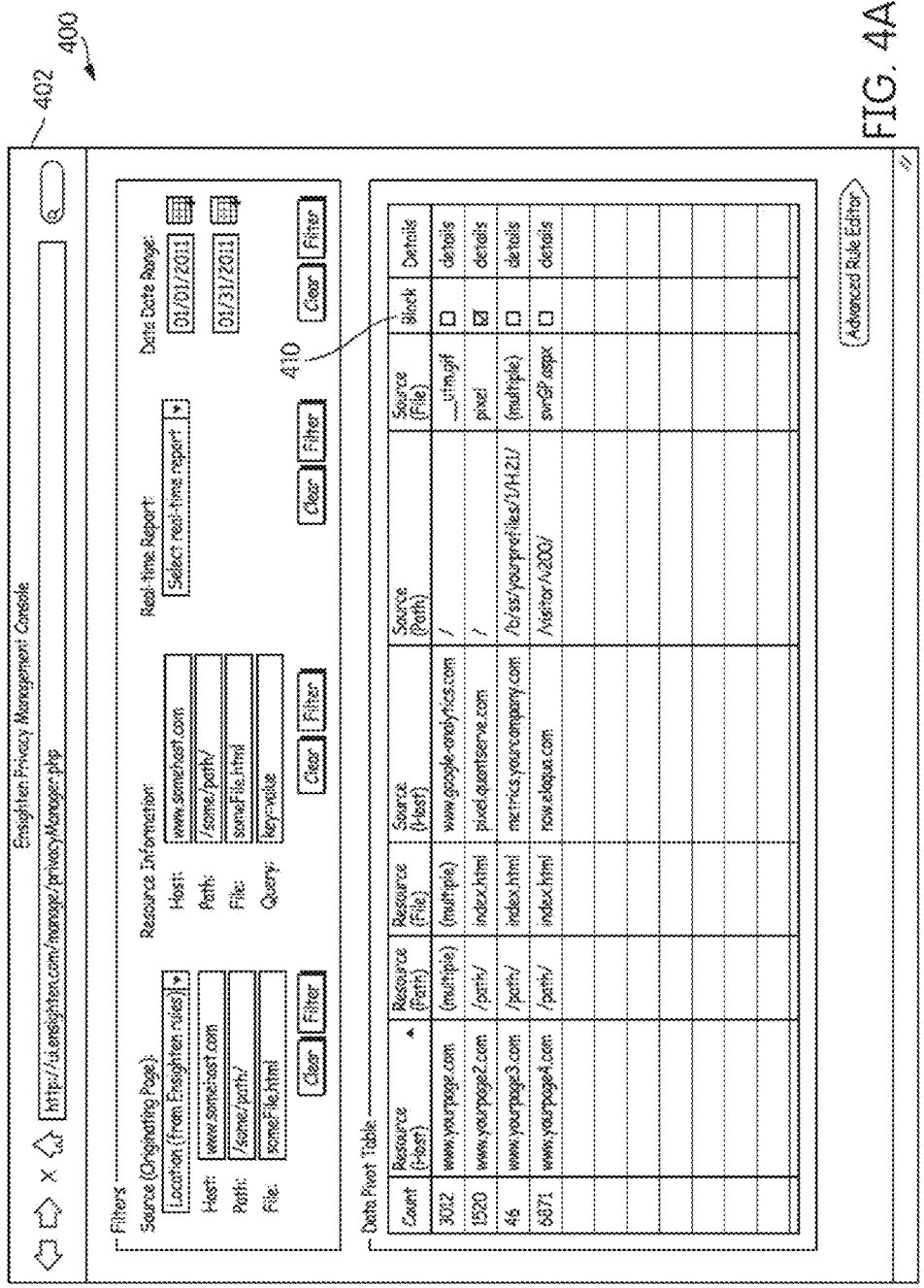
FIGS. 4A and 4B (based on, inter alia, Appendix B in U.S. Provisional Application Ser. No. 61/428,560) illustrate example graphical user interfaces for a privacy management console and an advanced rule editor, in accordance with various aspects of the disclosure.
Figure 4B:
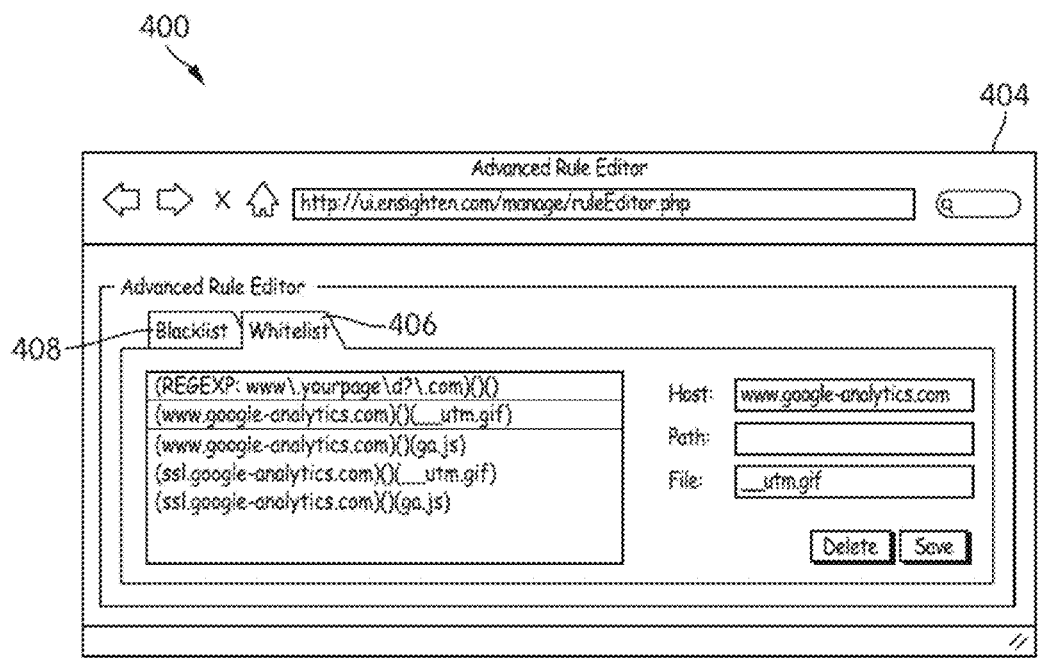

FIGS. 4A and 4B illustrate a graphical user interface 400 for a CPO dashboard 404. The PMS may store computer-executable instructions and/or provide client-browser scripting code so that the dashboard 404 may be presented on a computing device associated with Ensighten's database 506, on a remote computing device associated with a webpage owners's database 504 (e.g., a remote computing device of a CPO associated with an owner of the webpage), or on a remote computing device 100 of a webpage visitor. Aspects of the dashboard 404 allow the creation of privacy rules for authorizing or blocking direct access to the analytics data collected from a webpage. For example, the CPO dashboard may allow a CPO (or other user) to create privacy rules that cause a PMS to block particular types of collected visitor data from being sent to vendors based on the location of the visitor, whether the user terminal is a mobile or stationary terminal, or other parameter. For example, foreign (e.g., Germany) privacy regulations may require that no (or none of a particular type of) visitor data be sent to vendors. The CPO dashboard may configure 410 the PMS to detect the location of a website visitor (e.g., by reverse geocoding the visitor's IP address to identify the visitor's location) and to subsequently block any attempts to transmit data collected about the user to particular vendors (e.g., third party vendors, fourth party vendors, etc.). One of skill in the art will appreciate after review of the entirety disclosed herein that numerous other information and features may be displayed/available on the CPO dashboard. For example, the CPO dashboard 402 may display the attribute name and value of the name-value parameters of image "src" attributes. This may assist CPOs in determining what types of data are being collected and sent about visitors of their webpages. At least one technical advantage of the prior example is that a single PMS, in accordance with various aspects of the disclosure, may be used for all worldwide visitors and adjust based on various parameters, such as the location of the website visitor and the privacy regulations specific to that location. Moreover, the PMS may be adjusted based on other parameters and features apparent to one of skill in the art after review of the entirety disclosed herein, including any materials (e.g., an information disclosure statement) submitted concurrent with the filing of this disclosure.

Additionally, FIGS. 8A and 8B illustrate further aspects of the CPO dashboard 404. As shown in FIGS. 8A and 8B, the dashboard 404 may include a privacy info tab 801 and customize PMS tab 802 that, when selected, cause the dashboard 404 to provide a privacy info window 803 and a customize PMS window 804, respectively. The privacy info window 803 and customize PMS window 804 may provide the CPO with a number of options (or settings) for creating and/or editing rules. Such rules may instruct the PMS on how to operate.

When Ensighten's single consistent line of JavaScript code triggers the PMS to evaluate a particular webpage, the PMS may refer to stored rules, or settings, for that particular webpage and/or user to determine what private information should be blocked from being sent to third and fourth parties. In some embodiments, these rules may be used by the pattern recognition software so that it only recognizes private information that is to be blocked. In other embodiments, the pattern recognition software may identify all types of private information and the PMS may decide which private information should be blocked based on the rules (see step 728). Further, some rules may determine which modules of the PMS code should be implemented. For example, rules can inform the PMS code whether it should execute a module (e.g., one or more functions/methods) for reporting the analytics data to Ensighten's database and/or a module for changing the analytics data so that private information is protected.

Further, the rules created/edited through the privacy info window 803 and customize PMS window 804 may be applied to a particular webpage (e.g., webpage 502), an entire website, or multiple websites of a particular customer. For example, the CPO may indicate that the rules he/she sets in the privacy info window 803 are to be applied to all webpages on a particular website, so that the CPO does not have to create/edit rules for each webpage.

FIG. 8A illustrates example settings of the privacy info window 803. Via the privacy info window 803, a user (e.g., a CPO) may specify various types of private information that he/she wants to block from being collected as analytics data. For example, a CPO may determine that he/she is not willing to allow a third or fourth party to capture analytics data including an email address of a visitor to the CPO's webpage, and therefore, may select a check box next to the "Email Address" text. By selecting this check box, the CPO may instruct the PMS to block third and fourth parties attempting to capture email addresses of visitors to a particular webpage or website(s). In contrast, if a check box is not selected, this may be an indication that the CPO is willing to allow the corresponding type of private information to be captured as analytics data. For example, referring to FIG. 8A, the check box next to the "Age" text is not selected, and therefore, the CPO may allow third and fourth parties to extract an age of visitors to his/her webpage or website(s).

Although not shown in FIG. 8A, the privacy info window 803 may provide an option through which a user (e.g., CPO) may enter specific private information for a particular person (which may be the user herself) so that the PMS may identify and block the exact private information that a user wishes to keep from third and fourth parties. For example, the privacy window 803 may provide a user input field in which the user provides his/her phone number so that the PMS may ensure that the provided phone number is not included within transmitted analytics data.

FIG. 8B illustrates example settings of the customize PMS window 804. Via the customize PMS window 804, a user (e.g., a CPO) may set parameters that the PMS may use to determine which modules of code it should execute and/or which modules of code it should incorporate into the new wrapper object (e.g., which getter function and/or helper functions). For example, a CPO may turn the PMS's data analysis on or off using a virtual switch shown on the customize PMS window 804. When data analysis is turned off through the customize PMS window 804, the PMS code may determine not to analyze data at step 708. When data analysis is turned on, the PMS code may determine to analyze data at step 708, and therefore, may proceed to execute step 712.

Further, the CPO may specify which nodes should be obtained at step 702. In some examples, all nodes in the DOM of a webpage may be obtained. However, if the CPO prefers that only certain nodes be obtained and evaluated for private information, the CPO may designate such nodes through the customize PMS window 804. For example, a CPO may recognize that certain nodes in the DOM are relatively unlikely to be tapped for analytics data collection, and therefore, may choose not to have the PMS evaluate those nodes. Although the customize PMS window 804 in FIG. 8B shows that the CPO may select different node types (e.g., element nodes, text nodes, etc.), in some embodiments, the customize PMS window 804 may display the names of all nodes in a DOM for a webpage (or website) so that the CPO can select the particular nodes to obtain (and evaluate) instead of just designating the type of nodes.

Moreover, the customize PMS window 804 of FIG. 8B shows that a CPO may also select various solutions for dealing with a case in which private information is found. Based on the selected solutions, the PMS may execute different modules of code to perform steps 732, 734, and 736. For example, through the customize PMS window 804, a CPO may specify that when private information is detected, the PMS should modify the private information to change its value. In some examples, the CPO may indicate what value to change the private information to through the customize PMS window 804.

FIG. 8B intends to illustrate that methods/modules of the PMS code can be controlled through a dashboard 404. Although several settings are shown for controlling execution of the PMS code, other settings could be provided through the dashboard 404. Indeed, all optional features of the PMS disclosed herein could have a corresponding setting in the dashboard to allow the CPO to customize the PMS for a particular webpage or web site(s).

CPO Dashboard's ON/OFF Monitoring Switch

In addition, in some embodiments in accordance with the disclosure, the CPO dashboard may include an input means (e.g., graphical ON/OFF switch) to allow the CPO to toggle (e.g., turn off, turn on, turn partially on) the state of the PMS functionality if website performance is desired at the expense of realtime online privacy management. In response to the input means, a variable (e.g., a Boolean-type variable) in the Javascript code may be updated to activate or deactivate the PMS code. As such, when the switch is in the OFF position, the webpages may be rendered without interaction/analysis by the PMS Javascript code. Alternatively, when the switch is in the partially ON position, the PMS may choose to evaluate a particular type of node (e.g., element nodes, or image nodes) rather than all nodes in the DOM. The state of the input means (e.g., OFF, ON, partially ON, etc.) may be sent to a remote sever for storage and easy retrieval at a later time.

PMS-Certified Verification

Figure 3:
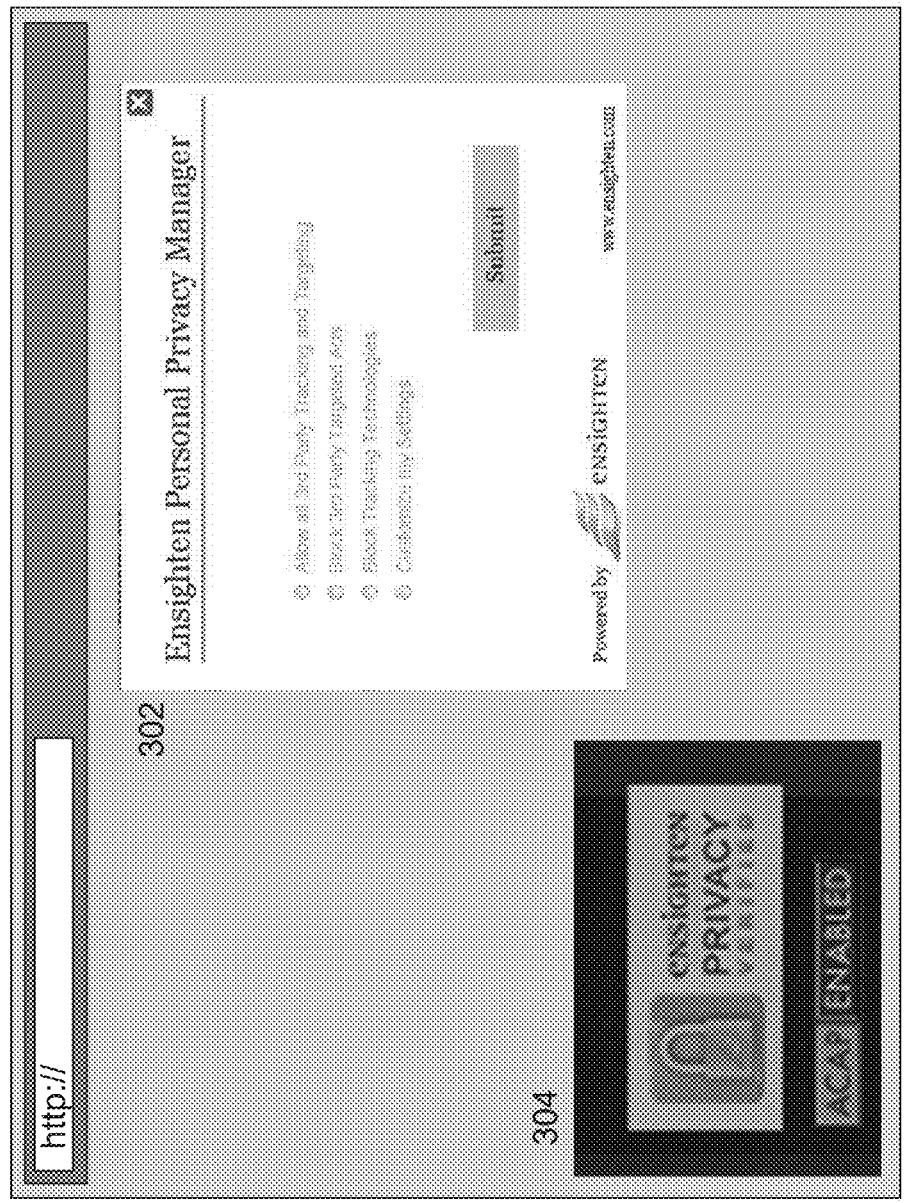
FIG. 3 is an illustrative graphical user interface showing a PMS-certified verification icon and privacy manager interface in accordance with various aspects of the disclosure.

FIG. 3 illustrates a web browser displaying a webpage (omitted) that has received certification from a PMS that the webpage/website complies with privacy policies. For example, icon 304 illustrates an icon that may appear on a webpage 502 to indicate to visitors to the webpage that the webpage has been verified (e.g., PMS-certified verification) and is being monitored using a PMS, which in some embodiments may be in accordance with various aspects of the disclosure. The graphical icon 304 may be selectable and upon its selection may display a dialog box 302. The dialog box 302 may permit a visitor to further customize his/her privacy settings/preferences. For example, the user can opt out of tracking and targeted ads completed (e.g., a user, upon verification of age, may be opted out of particular types (or even all) of tracking pursuant to child privacy laws because the user is a child under a particular age.) Upon selection of a setting, the user's preferences may be transmitted to a remote server (e.g., Ensighten's application server 506) to be saved and associated with the user. The association may be created using browser-side cookies. For example, a browser-side cookie may be saved on the visitor's device 100 with information that permits the PMS to automatically detect the user's preference on future visits.

In some embodiments, the dialog box 302 may include similar options to those discussed with reference to the privacy info window 803 of FIG. 8A. Thus, a user via the dialog box 302 may specify what types of private information to block from being transmitted as analytics data.

Companies may sign up with a PMS for monitoring and control of their analytics data collection and distribution. As a result, the icon 304 may be displayed on the company's webpages 502. Moreover, through the PMS client-browser scripting code (e.g., Javascript code) the PMS may detect and read cookies Internet-wide. For example, when visiting different websites, the PMS may be able to use the cookie-based approach to automatically implement the user's preference on all sites (e.g., once a user is verified as being under a particular age, the user's cookie settings may assist in automatically opted the user out of tracking and other activities on other websites.) One skilled in the art will appreciate after review of the entirety disclosed herein that numerous derivations of the base concept disclosed are contemplated. For example, the icon 304 may be displayed in different colors to indicate different levels of privacy management. The icon may be displayed primarily in red to indicate that the website operates under a privacy setting outside the threshold of comfort previously designated by the user. Meanwhile, the icon may be displayed primarily in green to indicate that privacy controls are commensurate with the user's preferences. In addition, a dashboard similar to the CPO dashboard may be made available to the user through selection of the icon 304. As such, the user may be able to identify and understand what aspects of their online experience are being monitored and where that information is being sent.

In addition to, or instead of, the icon 304, a webpage may include a plurality of icons. FIG. 9A illustrates a webpage 900 having lock icons 901 and unlock icons 902. The lock icons 901 and unlock icons 902 may be positioned in relatively close proximity to a corresponding piece of information, which may potentially be private information. For example, as shown in FIG. 9A, an unlock icon 902 may be positioned next to the name—"John Doe"—of the visitor to the webpage 900. Each lock icon 901 and unlock icon 902 indicates whether or not the corresponding piece of information is blocked from being included in analytics data. Specifically, pieces of information corresponding to lock icons 901 may be blocked from being included within analytics data, while pieces of information corresponding to unlock icons 902 might not be blocked from being included within analytics data. The lock icons 901 and unlock icons 902 may be included on the webpage 900 when nodes are replaced by wrapper objects. In other words, each wrapper object may include functions for presenting a lock icon 901 and/or unlock icon 902 in association with the data that it stores. When a lock icon 901 is presented, the getter function of the corresponding wrapper object may be configured to modify the data before returning the data or may refrain from returning the data at all. Meanwhile, when an unlock icon 902 is presented, the getter function of the corresponding wrapper object may be configured to return the data without modifying the data.

FIG. 9A also depicts an advertisement 905, which may be placed on the page by a third or fourth party. This advertisement 905 may be an image element configured to extract data from the webpage 900 and transmit the extracted data as analytics data to the third or fourth party or even another party. In such cases, the advertisement 905 may collect, e.g., the name, phone number, address, etc. appearing on the webpage 900. However, if the webpage 900 utilizes the PMS code, the PMS code may operate to block the advertisement 905 from collecting this information. In particular, the PMS may block the advertisement 905 from collecting private information, which here is the information associated with lock icons 901.

In some embodiments, the owner and/or CPO of the webpage 900 might not know the exact source of the advertisement 905, and/or might not know that the advertisement 905 is being used to collect analytics data. Indeed, in some cases, the node that is collecting analytics data may be invisible on the webpage 900. Therefore, the owner and/or CPO may choose to implement Ensighten's PMS code on their webpage or website(s). If so, Ensighten's PMS code may place the lock icons 901 and unlock icons 902 onto the webpage 900 as shown. By displaying the lock icons 901 and unlock icons 902 in proximity (e.g., within an inch) to the various pieces of information on the webpage 900, a visitor of the webpage 900 may be informed of the potential access to their information. Some users might not want their information being collected and may be attracted to webpages and websites that show them that their information is protected.

FIG. 9B illustrates another webpage 901 that may appear when a user selects the "Edit Profile" link on webpage 900. Notably, the webpage 901 may include a plurality of form fields 903, which are configured to accept user input. Lock icons 901 and unlock icons 902 may be associated with one or more of the form fields 903. Accordingly, a user can visualize which pieces of his/her information are being blocked from being included in analytics data. This may encourage users, who may otherwise be hesitant to enter information, to complete the form fields 903.

Moreover, the lock icons 901 and unlock icons 902 may be selectable elements (e.g., HTML elements) that, when clicked on, change from one icon to the other. That is, when a lock icon 901 is selected it may change to an unlock icon 902, and when an unlock icon 902 is selected it may change to a lock icon 901. Selecting the lock and unlock icons 901, 902 might not only change the appearance of the icons, but may also inform the PMS of the change. The PMS may parse the webpage 901 to extract the lock and unlock icons 901, 902 as it would any other element node. The PMS may then analyze the lock and unlock icons 901, 902 to determine which pieces of information the user wishes to block from being sent in analytics data. Based on this analysis, the PMS may store settings that can be used to create rules that the PMS may use when analyzing analytics data. That is, once these settings are stored, when the PMS evaluates analytics data, the PMS may implement certain rules to make sure the pieces of information that were associated with a lock icon 901 are considered as private information and are blocked from being sent to third and fourth parties. In particular, the rules may include parameters passed to the getter functions of wrapper objects used to replace certain nodes, so that the getter functions may determine whether or not to return requested data. For example, a lock icon 901 next to a piece of information may cause a particular getter function of a wrapper object, which is generally responsible for returning that piece of information upon request, to withhold that piece of information or modify it before returning it.

For example, referring to FIG. 9B, a user who enters his or her address in the address form field 903a, may desire that this address be blocked from being sent in analytics data. If so, the user may select (using, e.g., a cursor and clicking a mouse) the unlock icon 902 converting it into a lock icon 901. Once this occurs, the PMS may receive a notification of the change and may store the address into a list of private information. Thereafter, if a third or fourth party attempts to collect analytics data including the address inputted into the address form field 903a, the PMS may identify the address within the analytics data and clear it, or otherwise modify it, as described herein. Accordingly, the lock icons 901 and unlock icons 902 may have a similar effect as entering private information through the privacy info window 803 of the dashboard 404 described above.

Further, in addition to, or instead of, using the dialog box 302 to customize privacy settings, a user may select lock icons 901 and unlock icons 902. Through these lock icons 901 and unlock icons 902, website owners may give at least some control over what analytics data can be collected to their website visitors. Thus, rather than use the PMS code to block all analytics data that the website owner or CPO believes users would want blocked, the website owner or CPO may desire that the PMS code be configured to leverage user preferences to determine what information should be blocked from transmission as analytics data.

Additional Features

The PMS contemplated by this disclosure includes code in the Javascript language, but one of ordinary skill in the art after review of the entirety disclosed herein will appreciate that code written in other programming languages may be used in addition to or in lieu of Javascript. Numerous detailed examples in the disclosure have used Javascript merely as an example of a scripting language that allows dynamic update of the elements on a webpage and function overriding capabilities. The disclosure contemplates that Javascript may be one day deprecated in favor of another client-side (and server-side) scripting languages, and the disclosed PMS is not so limited. One of ordinary skill in the art will appreciate that Javascript may be substituted with other programming languages and technologies (e.g., DHTML 5.0 and canvas/video elements). In one example, Adobe Flash™ (formerly Macromedia Flash) objects embedded in a webpage may be dynamically manipulated using ActionScript™, a language similar to Javascript in that it also is based on the ECMAScript standard. This disclosure contemplates embodiments where Flash objects may be monitored using techniques that would be apparent to one of skill in the art after review of the entirety disclosed herein. For example, image resources, picture objects, and button objects may have methods overridden or inherited to provide for similar functionality as described herein. Similarly, other non-Javascript technologies, such as Silverlight™ may also be used in accordance with various aspects of the disclosure.

In addition, various aspects of the examples illustrated herein take advantage of the current version of Javascript and the capabilities it provides. For example, the Javascript specification currently does not permit overriding of the "setter" method of the "src" attribute of the HTML image element. If future versions of Javascript provide the ability to override the aforementioned method, one of skill in the art will appreciate after review of the entirety disclosed herein that appropriate adjustment to disclosed PMS features is contemplated by the disclosure. For example, the polling that is currently disclosed for monitoring the attributes of the image element/object may be replaced by an overriding method. Alternatively, if a value change notification feature becomes available in Javascript for the particular element, this disclosure contemplates that this feature may be used in lieu of (or in conjunction with) the polling technique currently described in one embodiment.

Furthermore, current web analytics technologies use image elements to transmit collected data from a user's device to a remote server. However, this disclosure contemplates other techniques for transferring collected data (e.g., analytics data) to a remote server. For example, Websockets™ may be used to create an open direct TCP/IP connection to a remote server to transmit analytics data. One skilled in the art will appreciate after review of the entirety disclosed herein that the PMS may override the method responsible for creation (e.g., adding, modifying, updating, and/or regulating) of Websockets and apply the principles disclosed herein accordingly.

Aspects of the disclosure are described herein in terms of illustrative embodiments thereof. Numerous other embodiments, modifications and variations within the scope and spirit of the recited disclosure will occur to persons of ordinary skill in the art from a review of this disclosure. For example, one of ordinary skill in the art will appreciate that the steps illustrated in the illustrative figures and described herein may be performed in other than the recited order, and that one or more illustrative steps may be optional in accordance with aspects of the invention.

What is claimed is:

1. A method comprising:

presenting, by a computing device, a user interface configured to receive user input indicating that transmission of a type of private information to a remotely-located computing device is not permitted;

replicating, by the computing device, a first node of an object model of a webpage in a web browser installed on the computing device to obtain a web browser object comprising user-related data of the first node, wherein the web browser object performs push model functionality of a wrapper object that overrides a predefined object;

configuring, by the computing device, the web browser object to perform an analysis of the user-related data responsive to an attempt to access the user-related data by a second node of the object model;

configuring, by the computing device, the web browser object to prevent the second node from accessing the user-related data responsive to determine from the analysis that the user-related data corresponds to the type of private information;

configuring, by the computing device, the web browser object to refrain from providing the user-related data to the second node;

configuring, by the computing device, the web browser object to obtain modified user-related data based on the user-related data of the first node and provide the modified user-related data to the second node instead of the user-related data, wherein a format of the modified user-related data matches a format of the user-related data; and replacing, by the computing device, the first node of the object model with the web browser object.

2. The method of claim 1, wherein the user interface is further configured to receive additional user input comprising user-specified data and an indication that the user-specified data is not permitted to be transmitted to the remotely-located computing device and further comprising:

configuring the web browser object to prevent the second node from accessing the user-related data responsive to determining from the analysis that the user-related data matches the user-specified data.

3. The method of claim 1, further comprising:

configuring the web browser object to prevent the second node from accessing the user-related data responsive to determining from the analysis that the user-related data corresponds to the type of private information and that the user-related data matches correct user-related data associated with a visitor to the webpage.

4. The method of claim 1, wherein:

the computing device is associated with an owner of the webpage.

5. The method of claim 1, wherein:

the computing device is associated with a visitor to the webpage.

* * * * *